United States Patent
Yan et al.

(10) Patent No.: US 11,482,729 B2
(45) Date of Patent: Oct. 25, 2022

(54) ELECTROLYTE COMPOSITION INCLUDING A SPECIFIC COMBINATION OF ADDITIVES, ITS USE AS NON-AQUEOUS LIQUID ELECTROLYTE IN A NA-ION BATTERY AND NA-ION BATTERY INCLUDING SUCH AN ELECTROLYTE COMPOSITION

(71) Applicants: Centre national de la recherche scientifique, Paris (FR); COLLEGE DE FRANCE, Paris (FR); Sorbonne Université, Paris (FR)

(72) Inventors: Guochun Yan, Changsha (CN); Jean-Marie Tarascon, Paris (FR)

(73) Assignees: Centre national de la recherche scientifique, Paris (FR); College de france, Paris (FR); Sorbonne Universite, Paris (FR)

( * ) Notice: Subject to any disclaimer, the term of this patent is extended or adjusted under 35 U.S.C. 154(b) by 168 days.

(21) Appl. No.: 16/754,961

(22) PCT Filed: Oct. 11, 2018

(86) PCT No.: PCT/EP2018/077773
§ 371 (c)(1),
(2) Date: Apr. 9, 2020

(87) PCT Pub. No.: WO2019/072986
PCT Pub. Date: Apr. 18, 2019

(65) Prior Publication Data
US 2020/0243910 A1 Jul. 30, 2020

(30) Foreign Application Priority Data
Oct. 11, 2017 (EP) .................................... 17306373

(51) Int. Cl.
| | |
|---|---|
| *H01M 10/0567* | (2010.01) |
| *H01M 4/587* | (2010.01) |
| *H01M 4/62* | (2006.01) |
| *H01M 10/054* | (2010.01) |
| *H01M 10/0568* | (2010.01) |
| *H01M 10/0569* | (2010.01) |
| *H01M 4/02* | (2006.01) |

(52) U.S. Cl.
CPC ....... *H01M 10/0567* (2013.01); *H01M 4/587* (2013.01); *H01M 4/622* (2013.01); *H01M 10/054* (2013.01); *H01M 10/0568* (2013.01); *H01M 10/0569* (2013.01); *H01M 2004/027* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 2011/0250509 A1* | 10/2011 | Yamaguchi | ......... | H01M 10/052 429/339 |
| 2013/0330610 A1* | 12/2013 | Shigematsu | ...... | H01M 10/0567 429/200 |
| 2015/0072225 A1* | 3/2015 | Ishiji | ................. | H01M 10/0567 429/200 |
| 2015/0303467 A1* | 10/2015 | Obrovac | ............... | H01M 4/583 429/188 |
| 2016/0072151 A1 | 3/2016 | Zhang | | |

FOREIGN PATENT DOCUMENTS

| | | |
|---|---|---|
| EP | 2 937 918 A1 | 10/2015 |
| WO | 2017/111143 A1 | 6/2017 |

OTHER PUBLICATIONS

International Search Report dated Nov. 7, 2018 for International Application No. PCT/EP2018/077773, 5 pages.
Written Opinion of the International Searching Authority dated Nov. 7, 2018 for International Application No. PCT/EP2018/077773, 6 pages.
Juner Chen et al., "Sodium-difluoro (oxalato)borate (NaDFOB): a new electrolyte salt for Na-ion batteries," Chemical Communications, vol. 51, No. 48, Jun. 2, 2015, pp. 980-9812,CP055452660.

* cited by examiner

*Primary Examiner* — Anca Eoff
(74) *Attorney, Agent, or Firm* — Knobbe, Martens, Olson & Bear, LLP

(57) ABSTRACT

Some embodiments include an electrolyte composition for a battery using sodium ions as electrochemical vector, to the use of such an electrolyte composition as non-aqueous liquid electrolyte in a sodium-ion battery and to a sodium-ion battery comprising such a non-aqueous liquid electrolyte. In some embodiments, the amount of (oxalato)borate ranges from 0.05 to 10 wt. %, relative to the total weight of the electrolyte composition.

18 Claims, 22 Drawing Sheets

Figure 1:
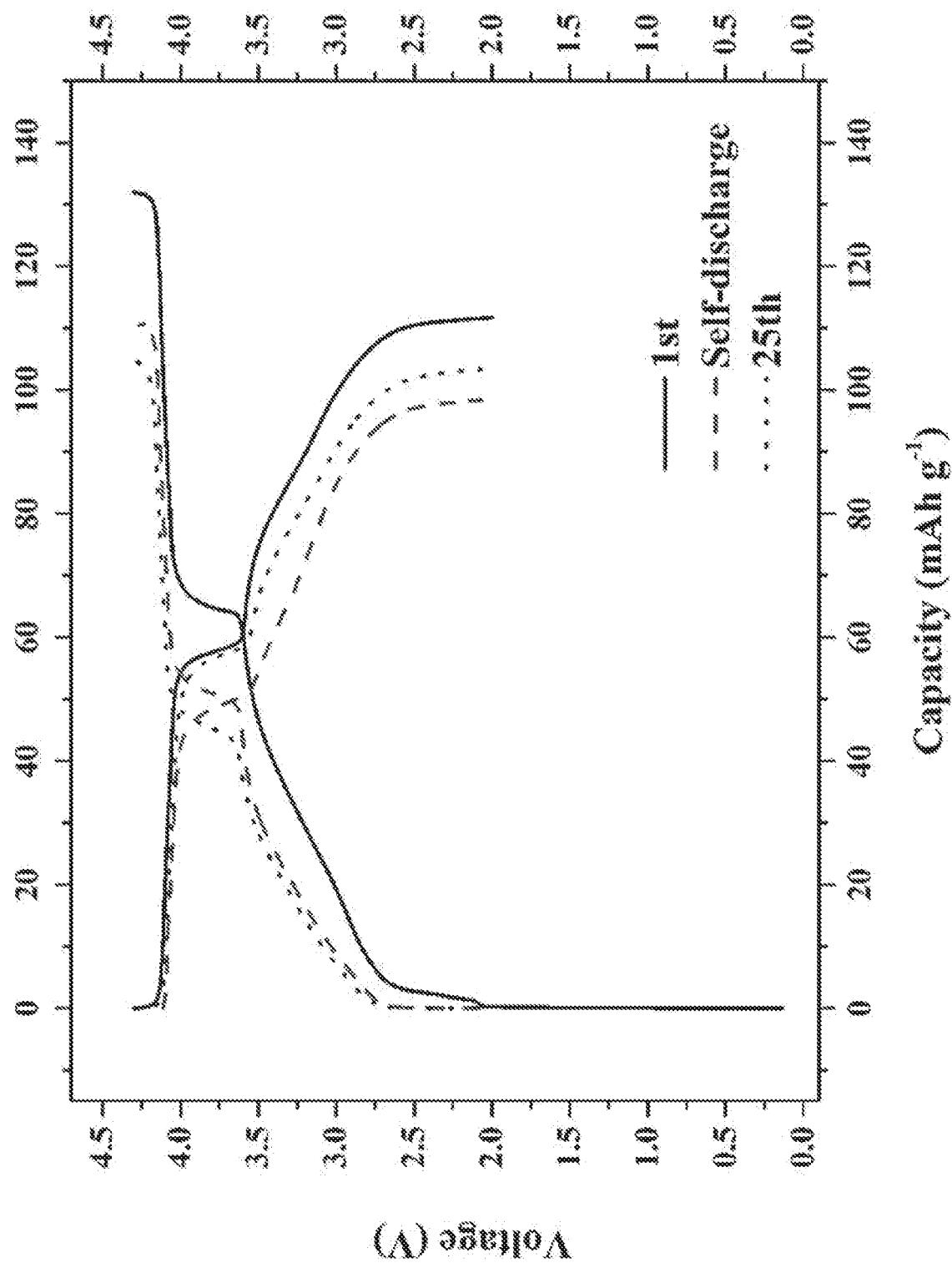

ELECTROLYTE COMPOSITION INCLUDING A SPECIFIC COMBINATION OF ADDITIVES, ITS USE AS NON-AQUEOUS LIQUID ELECTROLYTE IN A NA-ION BATTERY AND NA-ION BATTERY INCLUDING SUCH AN ELECTROLYTE COMPOSITION

CROSS REFERENCE TO RELATED APPLICATIONS

This application is the U.S. National Phase Application under 35 U.S.C. § 371 of International Application No. PCT/EP2018/077773 filed on Oct. 11, 2018, designating the U.S. and published as WO 2019/072986 on Apr. 18, 2019, which claims the benefit of European Patent Application No. 17306373.6 filed Oct. 11, 2017, which are hereby incorporated by reference in their entirety.

The present invention relates to an electrolyte composition for a battery using sodium ions as electrochemical vector, to the use of such an electrolyte composition as non-aqueous liquid electrolyte in a sodium-ion battery and to a sodium-ion battery comprising such a non-aqueous liquid electrolyte.

Today, lithium-ion (Li-ion) batteries have become the main power sources for portable electronic devices and they are conquering electrical vehicles because of their high energy density and excellent cycle life. However, the uncertainty about lithium reserves and ever-increasing costs of lithium compounds cannot fully cope with the demand of electric vehicles and large-scale grid storage applications for sustainability reasons.

The sodium-ion (Na-ion) technology appears as a promising alternative candidate for next-generation batteries, especially in the stationary energy storage field due to the high natural abundance and low cost of sodium as compared to lithium. This has led over the last decade to a blooming research on various components of sodium-ion batteries with great efforts towards developing new and superior electrode materials. Noticeable results were achieved. For instance, hard carbon (HC) from pyrolyzed glucose were shown to deliver high reversible capacity (around 300 mAh $g^{-1}$) through a low potential plateau (close to 0 V vs. Na/Na$^+$). Such carbon sets as today's best negative electrode materials in terms of electrochemical performance and cost despite the promising results provided by Na-alloys with among them the Na$_x$Sb phases being the most performing one.

Turning to the positive electrode, the research is parted between polyanionic and layered compounds. For layered oxides, P2-Na$_{2/3}$Fe$_{1/2}$Mn$_{1/2}$O$_2$ exhibits a high capacity of 190 mAh $g^{-1}$ and an average voltage around 2.75 V (vs. Na/Na$^+$), while for polyanionic compounds, Na$_3$V$_2$(PO$_4$)$_2$F$_3$ (NVPF) can deliver a moderate capacity (120 mAh $g^{-1}$) and a higher average voltage around 3.95 V (vs. Na/Na$^+$). Two of these systems, namely Na$_{2/3}$Fe$_{1/2}$Mn$_{1/2}$O$_2$/HC and Na$_3$V$_2$(PO$_4$)$_2$F$_3$/HC (NVPF/HC), both using non-aqueous liquid electrolyte nearly alike Li system (e.g. NaPF$_6$ dissolved in a mixture of cyclic and linear carbonates) are being presently developed with the emergence of the first 18650 prototypes. From previous optimization carried on these two systems regarding cell balance, working voltage range, energy density and power ability, it appears that NVPF/HC Na-ion system is the most attractive one because of its outstanding cycling and rate performance.

Na-ion batteries show excellent long-term cycling performance (capacity decay less than 0.018 mAh $g^{-1}$ per cycle at 1 C rate whatever the electrolytes) at 25° C., but suffer from poor cycling performances at 55° C. and copious self-discharge stemming from either reduction or oxidization of electrolytes. Linear carbonates are more unstable in the anode side, while cyclic carbonates are relatively easier to be oxidized on the cathode. Solving this self-discharge issue is mandatory to give this system a chance to reach the market place.

The Na-ion technology being similar in its principle to Li-ion batteries, its development massively benefits from the knowledge accumulated with the latter.

In particular, regarding Li-ion batteries, different solutions have already been proposed to improve certain properties such as the electrolyte's conductivity and the battery's cycling efficiency and reversible capacity. As an example, mention may be made of the use of a non-aqueous electrolyte including vinylene carbonate, halogenated methoxybenzene compounds or antioxidants as disclosed in particular in patent application EP 1 160 905-A1. As another example, mention may also be made of U.S. Pat. No. 7,833,661 which describes the use of at least one additive selected from 1,3-propane sultone, succinic anhydride, ethenyl sulfonyl benzene, and halobenzene, optionally in combination with biphenyl, cyclohexylbenzene and vinylene carbonate to improve a Li-ion battery's over-charge properties such that under over-charge conditions, a battery with said additives is reliable, safe, and not prone to fire or explosion. As still another example, one can mention patent application EP 2 683 014-A1 which describes a non-aqueous electrolyte additive that allows for improved safety and battery characteristics, said electrolyte including at least one first compound group consisting of phosphazene compounds of specific formula and at least one compound selected from a second compound group consisting of borate of specific formula, bis(oxalato)borate, difluoro(oxalato)borate tris(oxalato)phosphate, difluoro(bisoxalato)phosphates and tetrafluoro(oxalato)phosphate.

However, significant differences between Li- and Na-based systems prevent direct transposition of all the chemical tricks/techniques commonly used for lithium, namely at the electrolyte level owing to the different nature in composition of the forming, on the negative electrode, of a protective layer, called passivating layer (or SEI layer), which prevents subsequent reaction of the electrolyte on the negative electrode into which the sodium is inserted. This is mainly due to the fact that Na$^+$ is a milder acid that Li$^+$. It results that the forming Na-based organic/inorganic products have different solubility in the commonly used electrolytes.

In particular, up to now, and as described by S. Komaba et al. (ACS Applied Mater. Inter., 3 (2011) 4165-4168), it has been found that fluoroethylene carbonate (FEC) is the only efficient electrolyte additive for Na-ion batteries among FEC, difluoroethylene carbonate (DFEC), vinylene carbonate and ethylene sulphite (ES) that are well known as film-forming organic electrolytes additives in the Li-ions batteries.

There is therefore still a need for providing an electrolyte specifically designed for use in Na-ion batteries not having the drawbacks of the electrolytes of the prior art. There is also a need for Na-ion batteries having enhanced performances, in particular a reduced self-discharge and better retention capacity.

In particular, the aim of the present invention is to provide a non-aqueous liquid electrolyte having the ability of minimizing parasitic reactions to achieve high capacity retention capability and reduced self-discharge of Na-ion batteries, at cycling temperatures ranging from ambient temperature (i.e. 20-25° C.) to higher temperatures, in particular up to 55° C.

This aim is achieved by the non-aqueous electrolyte that will be described hereafter.

A first object of the present is an electrolyte composition comprising at least a sodium salt dissolved in at least one solvent and a combination of additives, wherein:
said solvent is selected from the group consisting of ethylene carbonate (EC), dimethyl carbonate (DMC), ethyl methyl carbonate (EMC), diethyl carbonate (DEC), propylene carbonate (PC), ethyl acetate (EA), ethyl propionate (EP), methyl propionate (MP) and mixtures thereof;
the combination of additives includes at least:
i) sodium difluoro(oxalato)borate (NaODFB), as a first additive,
ii) at least a nitrile of formula (I):

$$N\equiv C-(CH_2)_n-C\equiv N \quad (I)$$

with n being an integer equal to 2, 3 or 4, as a second additive; and
iii) 1,3-propane sultone or ethylene sulfate, as a third additive.

The electrolyte composition according to the invention, when used as a non-aqueous liquid electrolyte in a Na-ion battery, enables the proper functioning of said battery, especially of Na-ion batteries having a hard carbon negative electrode including a binder, in particular carboxymethylcellulose, not only at room temperature but also at higher temperatures up to 55° C. with limited self-discharge, hence providing better performances.

According to a preferred embodiment of the present invention, the amount of NaODFB ranges from about 0.05 to 10 wt. %, more preferably from about 0.2 to 2.0 wt. %, and even more preferably from about 0.2 to 0.5 wt. % relatively to the total weight of the electrolyte composition.

Nitriles encompassed by formula (I) are succinonitrile (n=2), glutaronitrile (n=3) and adiponitrile (n=4). Among these nitriles, succinonitrile is preferred.

The amount of nitrile of formula (I) may range from about 0.1 to 10 wt. %, and more preferably from about 0.5 to 3.0 wt. % relatively to the total weight of the electrolyte composition. When the nitrile of formula (I) is succinonitrile or glutaronitrile, it is preferably present in a range varying from about 0.1 to 5.0 wt. %, and even more preferably from about 0.5 to 2.0 wt. % relatively to the total weight of the electrolyte composition.

The amount of the third additive may range from about 0.1 to 5.0 wt. % and preferably from about 0.5 to 3.0 wt. %, relatively to the total weight of the electrolyte composition.

According to a preferred embodiment of the present invention, the third additive is 1,3-propane sultone.

According to a particular and preferred embodiment of the present invention, the solvent is a mixture of at least two solvents comprising ethylene carbonate as a first solvent and a second solvent selected from the group consisting of DMC, EMC, DEC, PC, EA, EP and MP. According to this particular embodiment the second solvent is even more preferably PC.

The volume ratio of the first solvent to the second solvent may range in from 1:20 to 20:1 and preferably from 1:9 to 5:1.

A mixture of ethylene carbonate and propylene carbonate in a volume ratio of 1:1 is particularly preferred according to the present invention.

The nature of the sodium salts is not critical according to the invention. The sodium salt may be chosen among the salt commonly used in non-aqueous electrolyte suited for Na-ion batteries. As examples of sodium salt, one can mention sodium hexafluorophosphate (NaPF$_6$), sodium perchlorate (NaClO$_4$), sodium bis (fluorosulfonyl) imide (NaFSI), sodium bis(trifluoromethanesulfonyl)imide (NaTFSI), sodium bis(pentafluoroethanesulfonyl)imide (NaBETI), sodium tetrafluoroborate (NaBF$_4$), and one of their mixture.

The amount of sodium salt in the electrolyte composition may range from about 0.1 to 3.0 mol/L and preferably from about 0.5 to 2.0 mol/L.

In addition to the first, second and third additives defined above, the combination of additives may further comprise a forth additive chosen among vinylene carbonate and vinylethylene carbonate, preferably vinylene carbonate.

When present, the amount of the forth additive may range from about 0.1 to 10.0 wt. % and more preferably from about 0.5 to 5.0 wt. %, relatively to the total weight of the electrolyte composition.

According to a particular and especially preferred embodiment of the present invention, the electrolyte composition includes NaODFB, succinonitrile, 1,3-propane sultone and vinylene carbonate.

As an even more preferred embodiment of the present invention, the electrolyte composition includes NaODFB, succinonitrile, 1,3-propane sultone and vinylene carbonate in a mixture of EC and PC in a volume ratio of 1:1.

As a specific example of such an embodiment, one can mention the following electrolyte composition comprising:
NaODFB in an amount of 0.5 wt. %,
succinonitrile in an amount of 1.0 wt. %,
1,3-propane sultone in an amount of 3 wt. %,
vinylene carbonate in an amount of 5 wt. %,
a sodium salt, in particular 1 mol/L of NaPF$_6$,
EC/PC in a volume ratio of 1:1.

The electrolyte composition of the present invention may be prepared by any method known in the technical field, in particular by mixing the first and second solvent in the desired volume ratio, preferably under stirring, and then adding the sodium salt and the combination of additives into the solution. The adding sequence may be changes like adding the combination of the additives onto the mixture of solvents and then adding the sodium salt. The whole process is preferably carried out in inert atmosphere, for example under argon or nitrogen gas.

As already mentioned, the electrolyte composition of the present invention is particularly suited to be used in a Na-ion battery.

Therefore, a second object of the present invention is the use of an electrolyte composition as defined according to the first object of the present invention, as a non-aqueous liquid electrolyte in a Na-ion battery, in particular for a Na-ion battery comprising a hard carbon negative electrode including a binder, in particular carboxymethylcellulose.

A third object of the present invention is the use of an electrolyte composition as defined according to the first object of the present invention as a non-aqueous liquid electrolyte to reduce self-discharge and enhance retention capacity in a Na-ion battery, in particular in a Na-ion battery comprising a hard carbon negative electrode including a binder, in particular carboxymethylcellulose.

According to this third object, the reduction of self-discharge is observed when said battery is cycling at a temperature ranging from about room temperature (20-25° C.) to 55° C.

A forth object of the present invention is a Na-ion battery comprising:
- at least one positive electrode comprising at least one positive electrode active material and a current collector,
- at least one negative electrode comprising a negative electrode active material, and
- at least one separator impregnated with a non-aqueous liquid electrolyte, said separator being disposed between said positive electrode and said negative electrode,
- wherein said non-aqueous liquid electrolyte is an electrolyte composition as defined according to the first object of the present invention.

The positive electrode active material is a material capable of inserting sodium ions reversibly which may be chosen among oxides such as $Na_xMO_2$ in which M represents at least one transition metal selected from the group comprising Ni, Co, Mn, Fe, Cr, Ti, Cu, V, Al and Mg and phosphates such as $NaTi_2(PO_4)_3$, $Na_3V_2(PO_4)_3$, $Na_3V_2(PO_4)_2F_3$, $Na_2MnP_2O_7$, $Na_2MnPO_4F$, $Na_{1.5}VPO_{4.8}F_{0.7}$ and $NaV_{1-x}Cr_xPO_4F$. Among these positive electrode active materials, $Na_3V_2(PO_4)_2F_3$, also named NVPF, $Na_{2/3}Ni_{1/3}Mn_{2/3}O_2$, and a mixture thereof, are particularly preferred.

In addition to the positive electrode active material, the positive electrode may further include a polymer binder and optionally an electronic conducting agent.

As example of polymer binder, mention may be made of polyvinylidene difluoride (PVdF), poly(tetrafluoroethylene) (PTFE), cellulose fibers, cellulose derivatives such as starch, carboxymethyl cellulose (CMC), diacetyl cellulose, hydroxyethyl cellulose or hydroxypropyl cellulose, styrene butadiene rubber (SBR) and a mixture thereof. Among these binders, PVdF is preferred.

The conductive agent may be carbon black, Super P carbon black, acetylene black, ketjen black, channel black, natural or synthetic graphite, carbon fibers, carbon nanotubes, vapor grown carbon fibers or a mixture thereof.

The weight proportions, relatively to the total weight of the positive electrode, are preferably:
Positive electrode active material: 80 to 98%
Electronic conducting agent: 1 to 10%
Polymer binder: 1 to 10%.

The negative electrode active material used for the negative electrode can be selected among carbon materials, in particular hard carbon, carbon nanofibers or carbon felt, antimony, tin, and phosphorus.

According to a preferred embodiment of the present invention, the negative electrode active material is a carbon material and said negative electrode further comprises a polymer binder which may be chosen among the same polymer binders as those mentioned above for the positive electrode. According to a preferred embodiment, the positive effects of the electrolyte composition of the present invention are particularly noticeable when the negative electrode includes a carbon material and carboxymethylcellulose as binder.

As mentioned for the positive electrode, the negative electrode may further include a conductive agent which may be chosen among the same conductive agent as those mentioned above for the positive electrode.

The negative electrode may also include a current collector.

The current collectors of the positive and negative electrodes may be composed of a conductive material, more particularly of a metallic material which may be selected from aluminum, copper, nickel, titanium and steel.

The separator may be a conventional polymer-based separator including polypropylene and/or polyethylene such as a Celgard® separator or glass fibers, such as a Whatman® borosilicate glass fiber separator, or a cellulose-based separator, such as a Dreamweaver® nonwoven nanofiber separator.

A Na-ion battery according to the invention may be composed of a single electrochemical cell comprising two electrodes (i.e. one positive electrode and one negative electrode) separated by an electrolyte; or of a plurality of chemical cells assembled in series; or of a plurality of chemical cells assembled in parallel; or of a combination of the two assembly types.

The present invention is illustrated in more detail in the examples below, but it is not limited to said examples.

Example 1

Preparation of Electrolyte Compositions According to the Invention or not Forming Part of the Invention Electrolyte compositions EC1 and EC2, according to the present invention, and comprising the additives detailed in Table 1 below (in wt. %), have been prepared in a mixture of solvents EC/PC in a volume ratio of 1:1 comprising 1 mol/L of $NaPF_6$:

TABLE 1

| Electrolyte Composition | EC1 | EC2 |
|---|---|---|
| NaODFB | 0.5 | 0.5 |
| Succinonitrile | 1.0 | 1.0 |
| 1,3-propane sultone | 3.0 | 3.0 |
| Vinylene carbonate | — | 5.0 |

Electrolyte compositions EC1 and EC2 have been prepared by adding the additives into EC/PC solvent containing 1 mol/L of $NaPF_6$.

For comparative purpose, electrolyte compositions EC3 to EC10, not forming part of the present invention because not containing all the three additives of the specific combination of additives included in the electrolyte composition of the invention, have also been prepared in the same conditions as for EC1 and EC2, i.e. solvent=EC/PC in a volume ratio of 1:1 containing 1 mol/L of $NaPF_6$.

The compositions of EC3 to EC10 are given in Table 2 below (wt. %):

TABLE 2

| Electrolyte Composition | NaODFB | Succinonitrile | 1,3-propane sultone | Vinylene carbonate |
|---|---|---|---|---|
| EC3 | — | — | — | — |
| EC4 | 0.5 | — | — | — |
| EC5 | — | 1.0 | — | — |
| EC6 | — | — | 3.0 | — |
| EC7 | — | — | — | 5.0 |
| EC8 | 0.5 | — | — | 5.0 |
| EC9 | 0.5 | — | 3.0 | — |
| EC10 | 0.5 | 1.0 | — | 5.0 |

Example 2

Comparative Study of the Electrochemical Performances of Na-Ion Batteries Including Electrolyte Compositions EC1 to EC10

The effects of the electrolyte compositions EC1 and EC2 according to the present invention and the self-discharge and capacity retention of a Na-ion battery have been studied and compared to those of electrolyte compositions EC3 to EC10 not forming part of the present invention.

The effects of all the above-mentioned electrolyte compositions have been tested in coin cells having the following configuration.

The positive electrode was prepared by mixing NVPF (mass loading: 12.0 mg/cm$^2$), with PVdF 4.0 wt. %) and carbon black (6.0 wt. %). The resulting mixture was dispersed in N-methyl-2-pyrrolidone to form a homogeneous slurry. The slurry has then been casted onto a current collector made of an aluminum foil. The positive electrode was dried at 120° C. and then pressed by a roller machine.

The negative electrode was prepared by mixing hard carbon (mass loading 6.0 mg/cm$^2$) with carboxymethylcellulose (3.0 wt. %) and carbon black (3.0 wt. %). The resulting mixture was dispersed in water to form a homogeneous slurry. The slurry has then been casted onto a current collector made of an aluminum foil. The negative electrode was dried at 120° C. and then pressed by a roller machine.

The positive electrode, the separator (glass fiber separator Whatman®, GF/D) and the negative electrode have been stacked layer by layer (one layer of electrode by one layer of separator), folded and winded to a designed cell core, placing the core inside of the cell shell. The cell has then been dried at 85° C. under vacuum (less than 1.0 bar) for 24 hours. The different electrolyte compositions EC1 to EC10 have then been injected into the cells. The cells have been sealed to assembling corresponding Na-ion batteries Na—B1 to Na—B10, respectively comprising EC1 to EC10 as non-aqueous liquid electrolyte.

Another cell using the same positive electrode, the same separator comprising electrolyte composition EC2, and a negative electrode identical to the above-described negative electrode except that carboxymethylcellulose was replaced with PVdF (3.0 wt. %) was also prepared. This cell was named Na—B11.

All tests were carried out in the following conditions:
Voltage range: 2.0-4.3V,
Current C/10-D/10 (according to the invention, 1C/1D respectfully mean spending one hour to fully charge or discharge the cell, then C/10 means 10 hours to charge the cell and D/10 means 10 hours to discharge the cell).
Whole tests procedure was set at 55° C. in an incubator, as follows: after 10 cycles at C/10, the cells were fully charged at 4.3 V, rest for 1 week, then discharged at D/10.
After self-discharge test, the cells are kept cycling.

Figure 2:
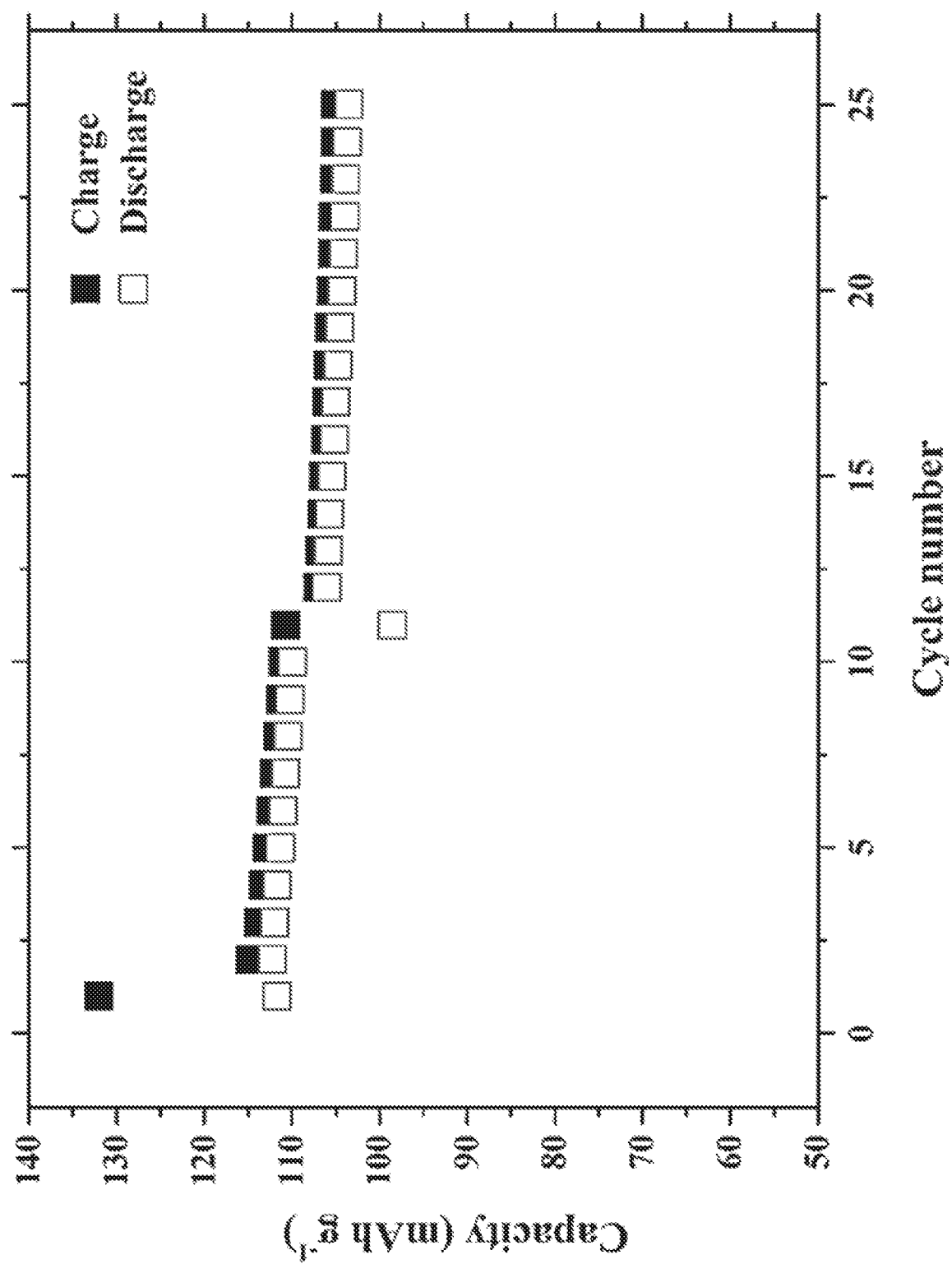
Figure 3:
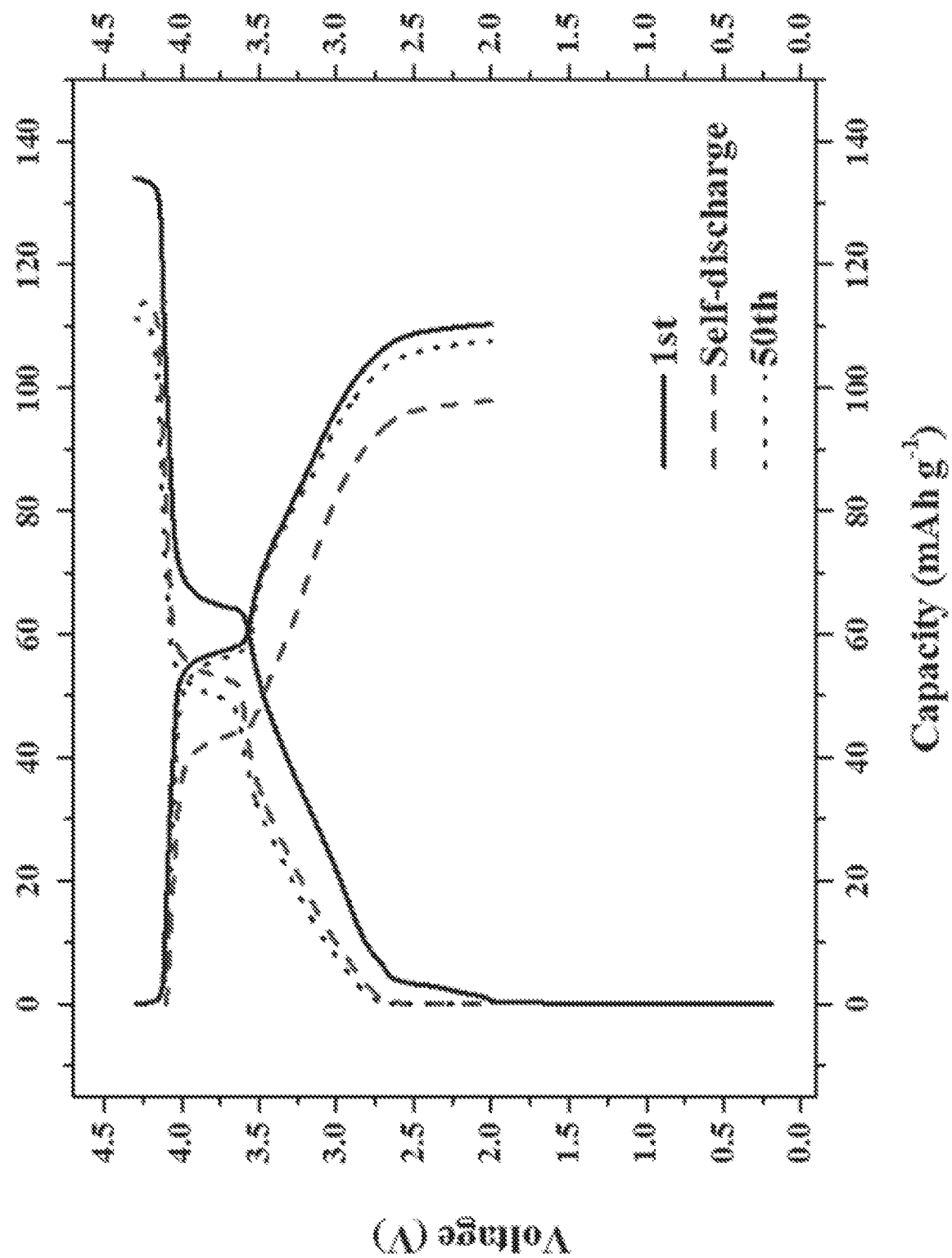
Figure 4:
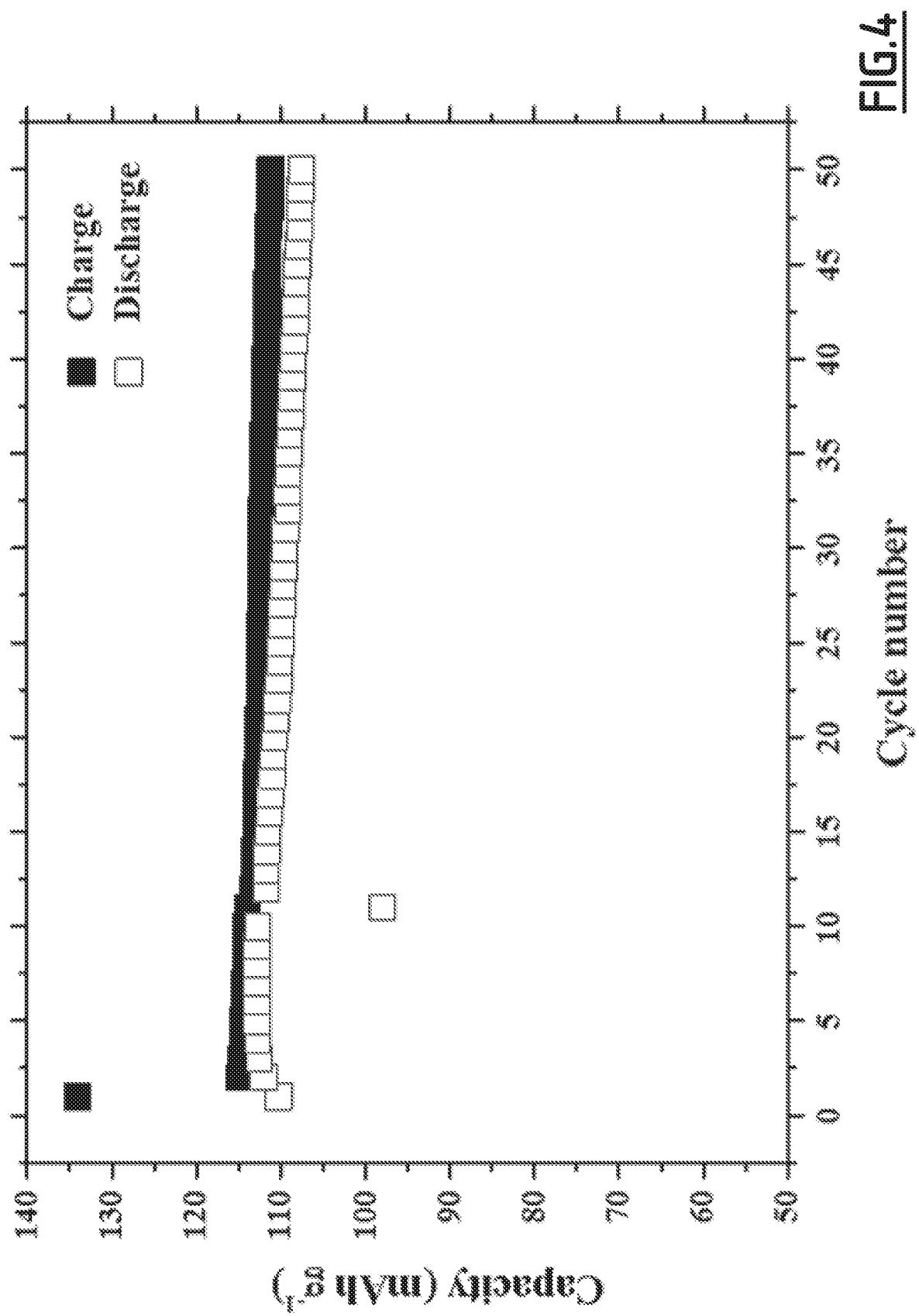
Figure 5:
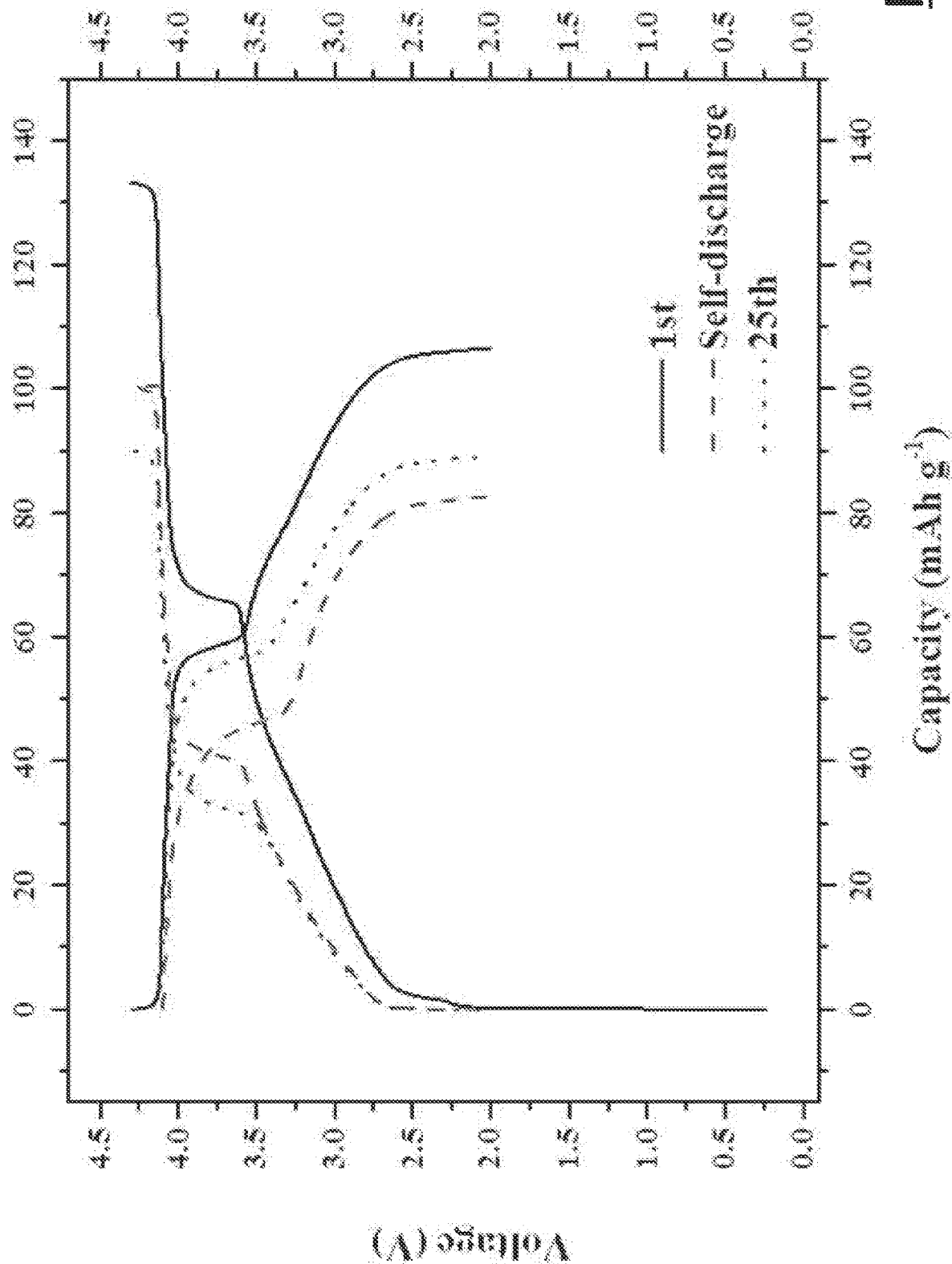
Figure 6:
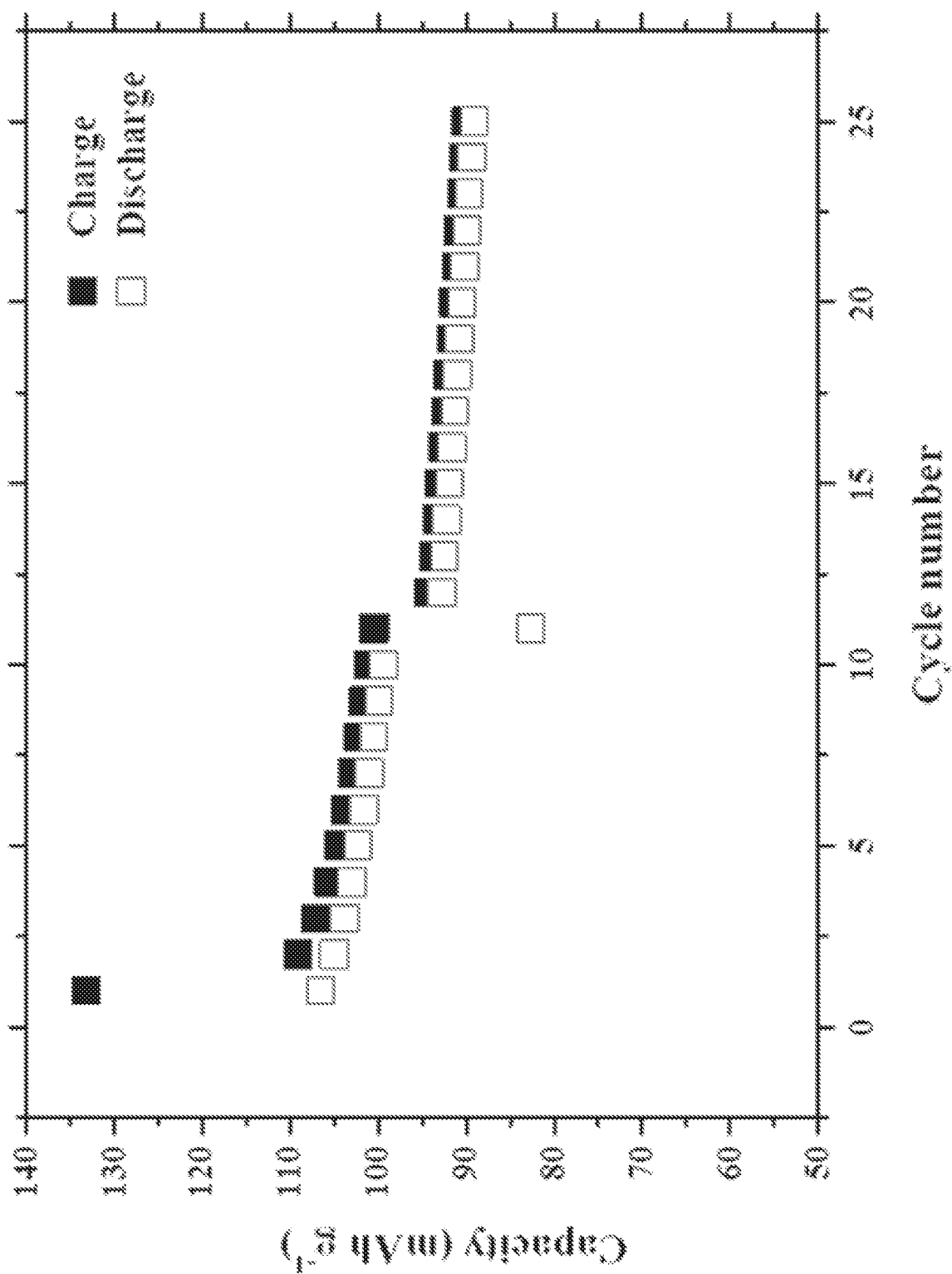
Figure 7:
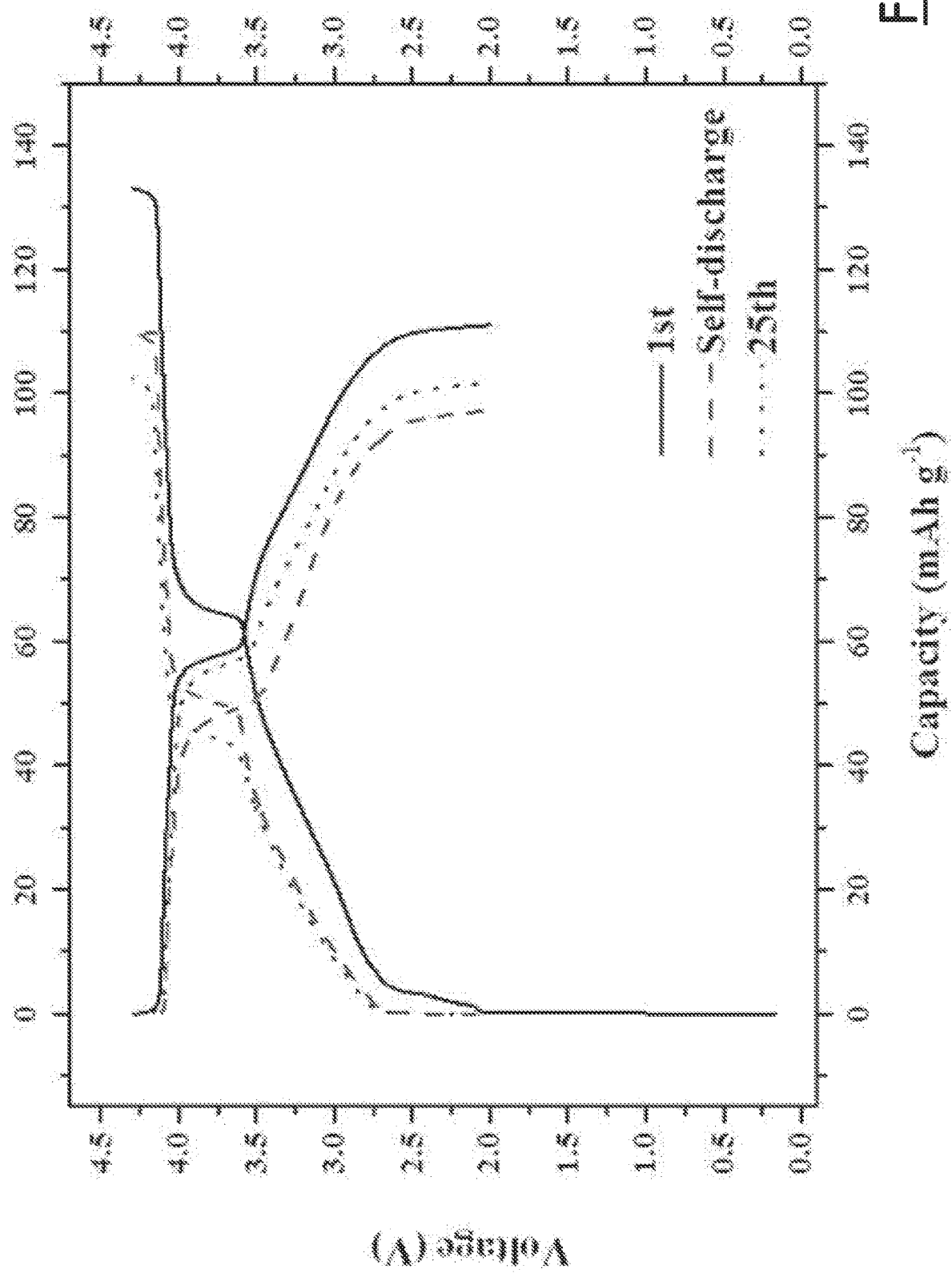
Figure 8:
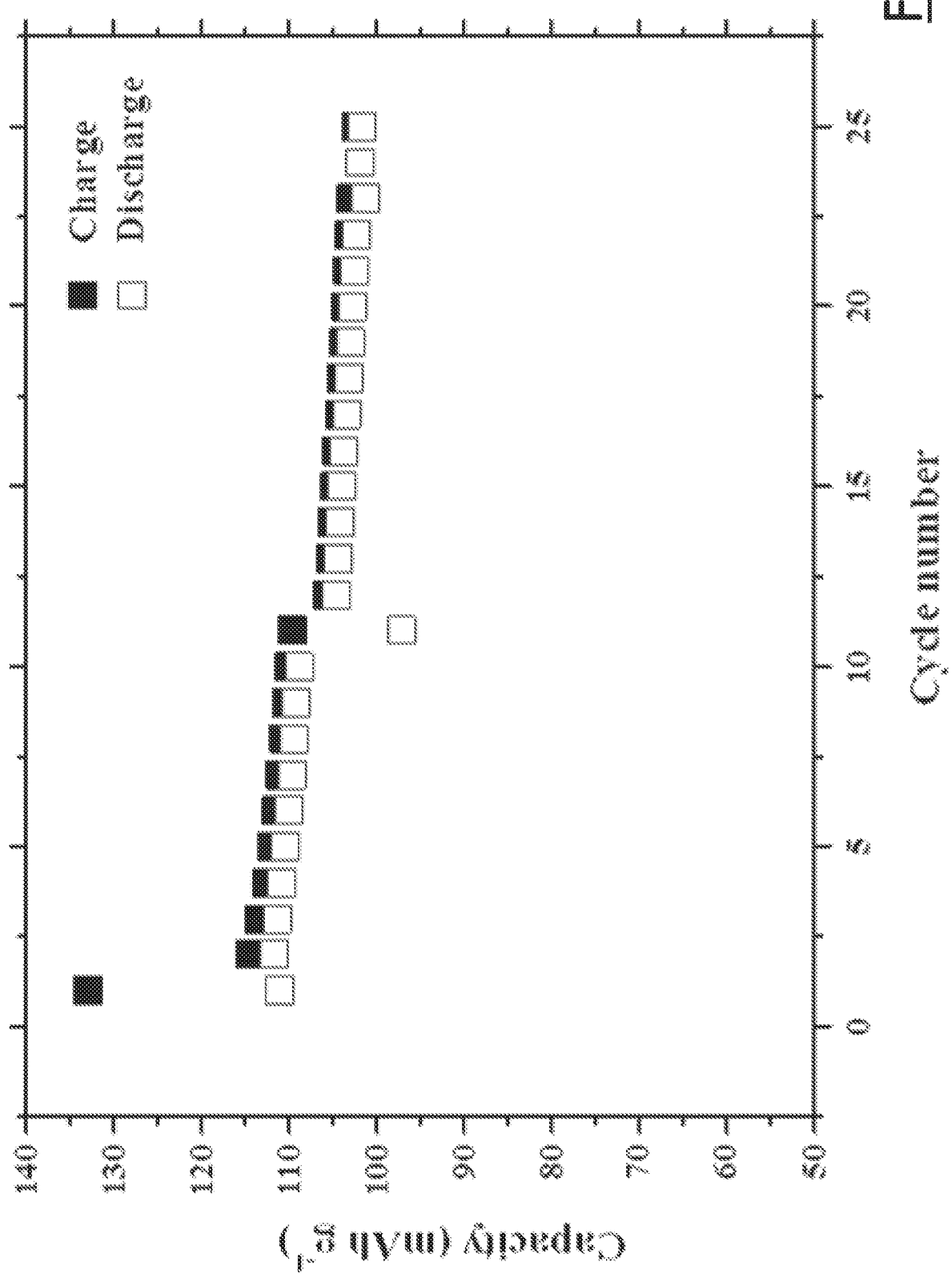
Figure 9:
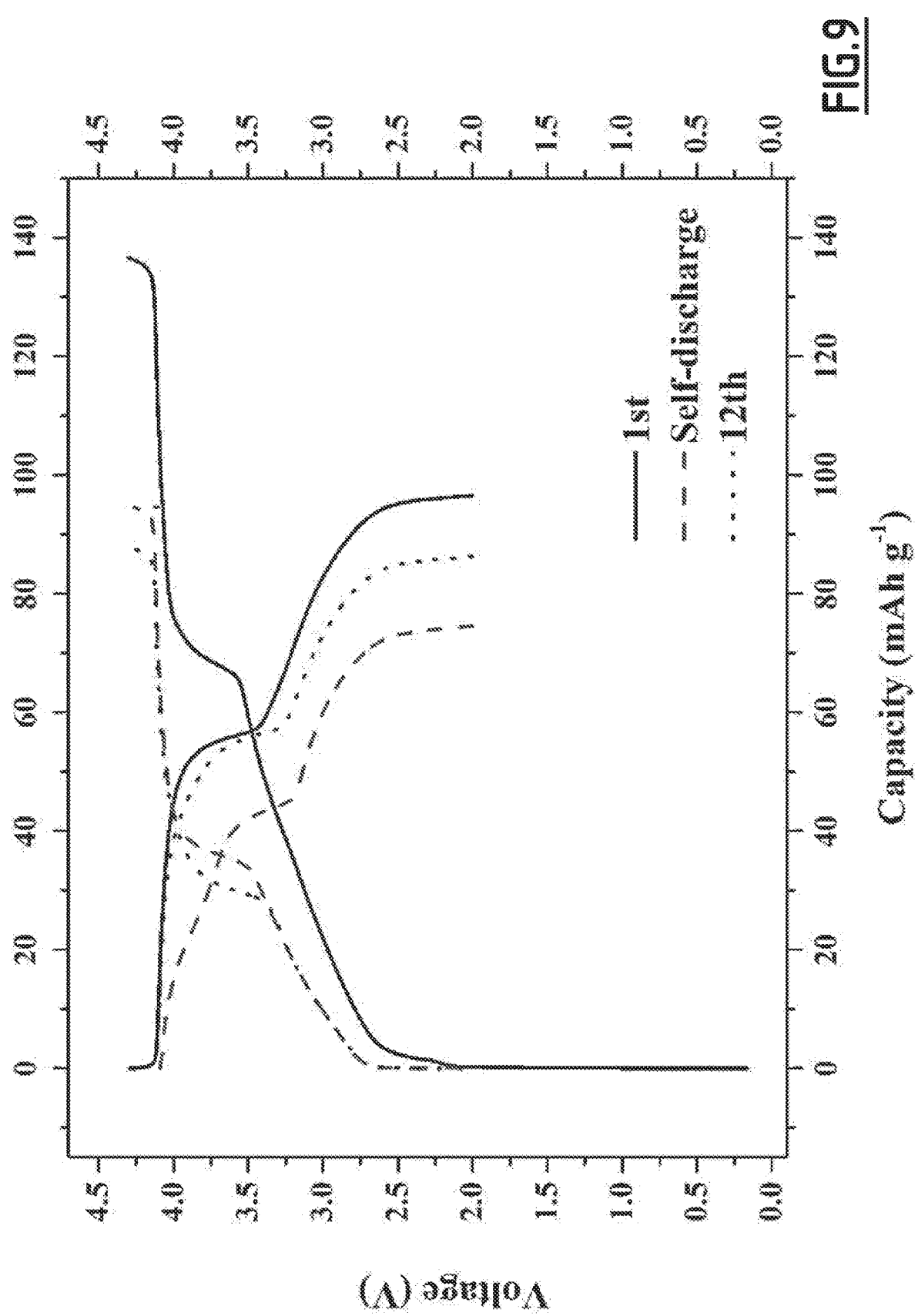
Figure 10:
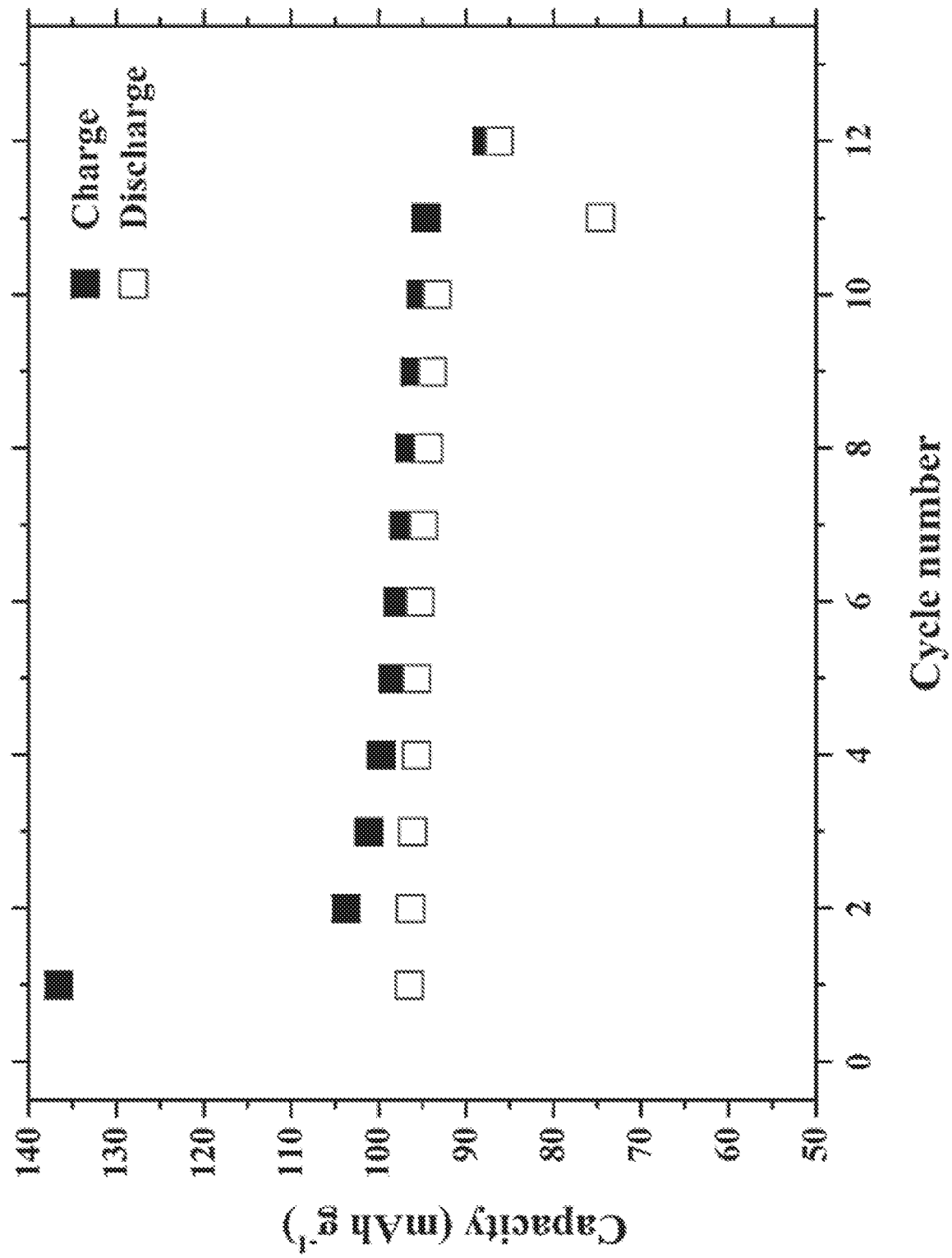
Figure 11:
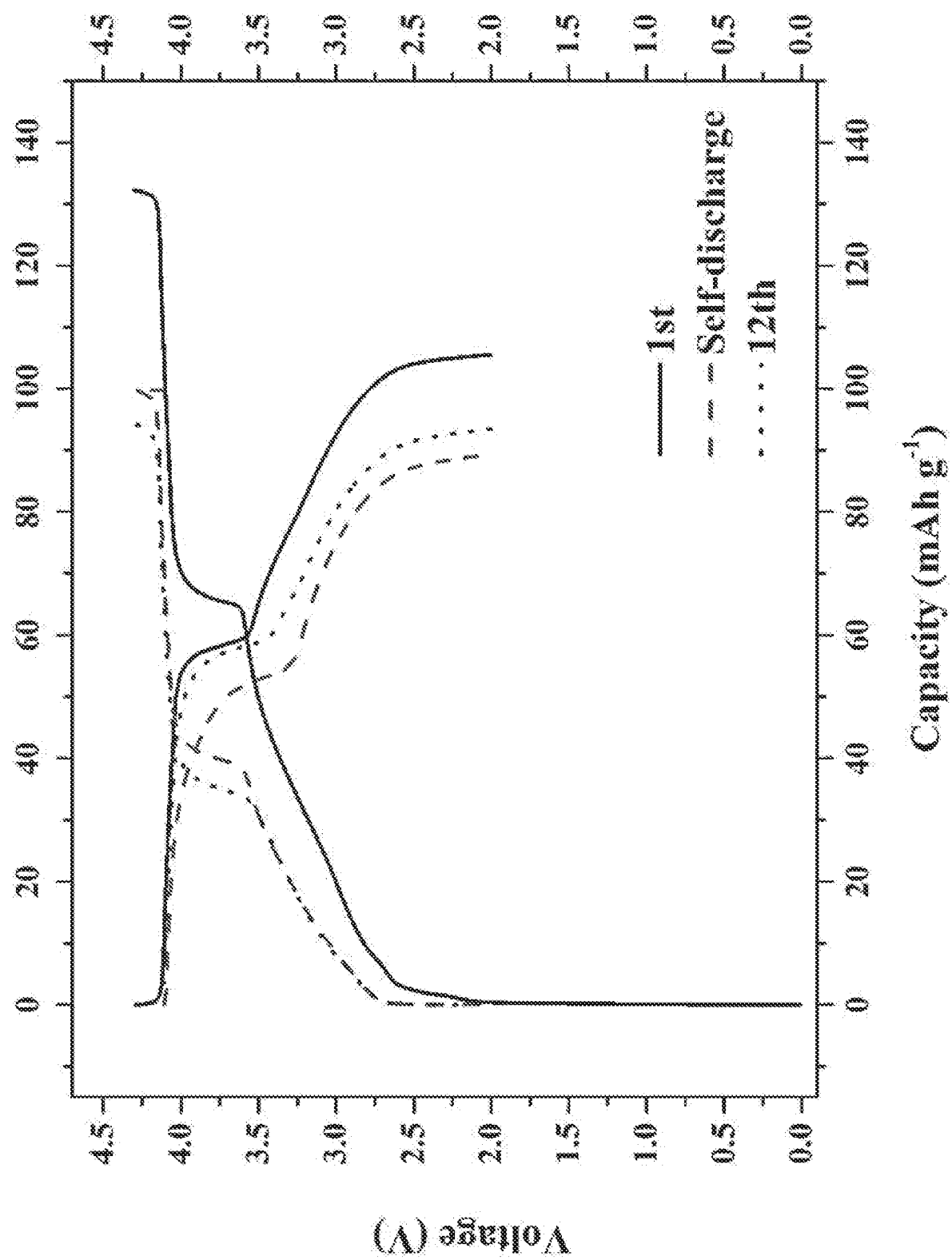
Figure 12:
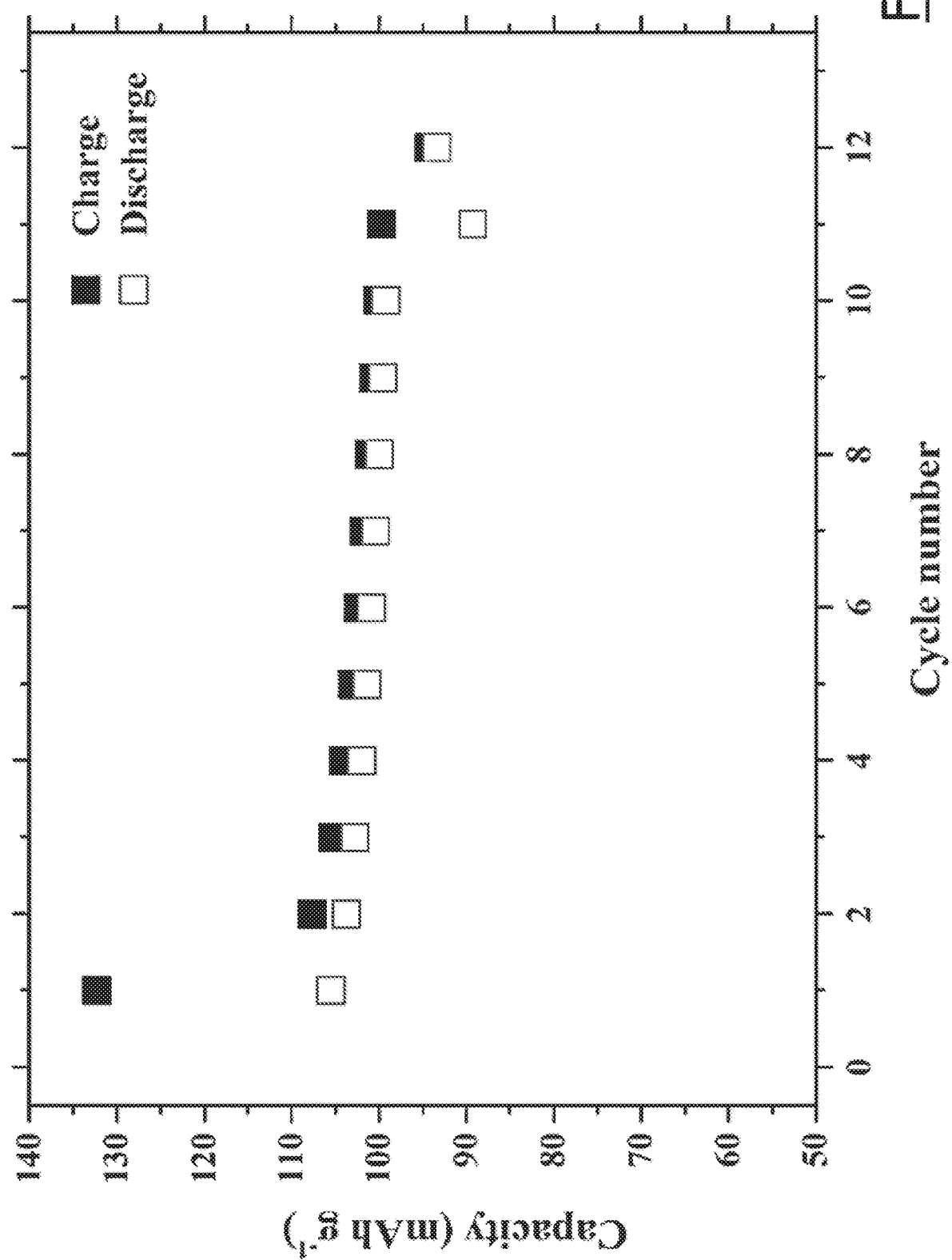
Figure 13:
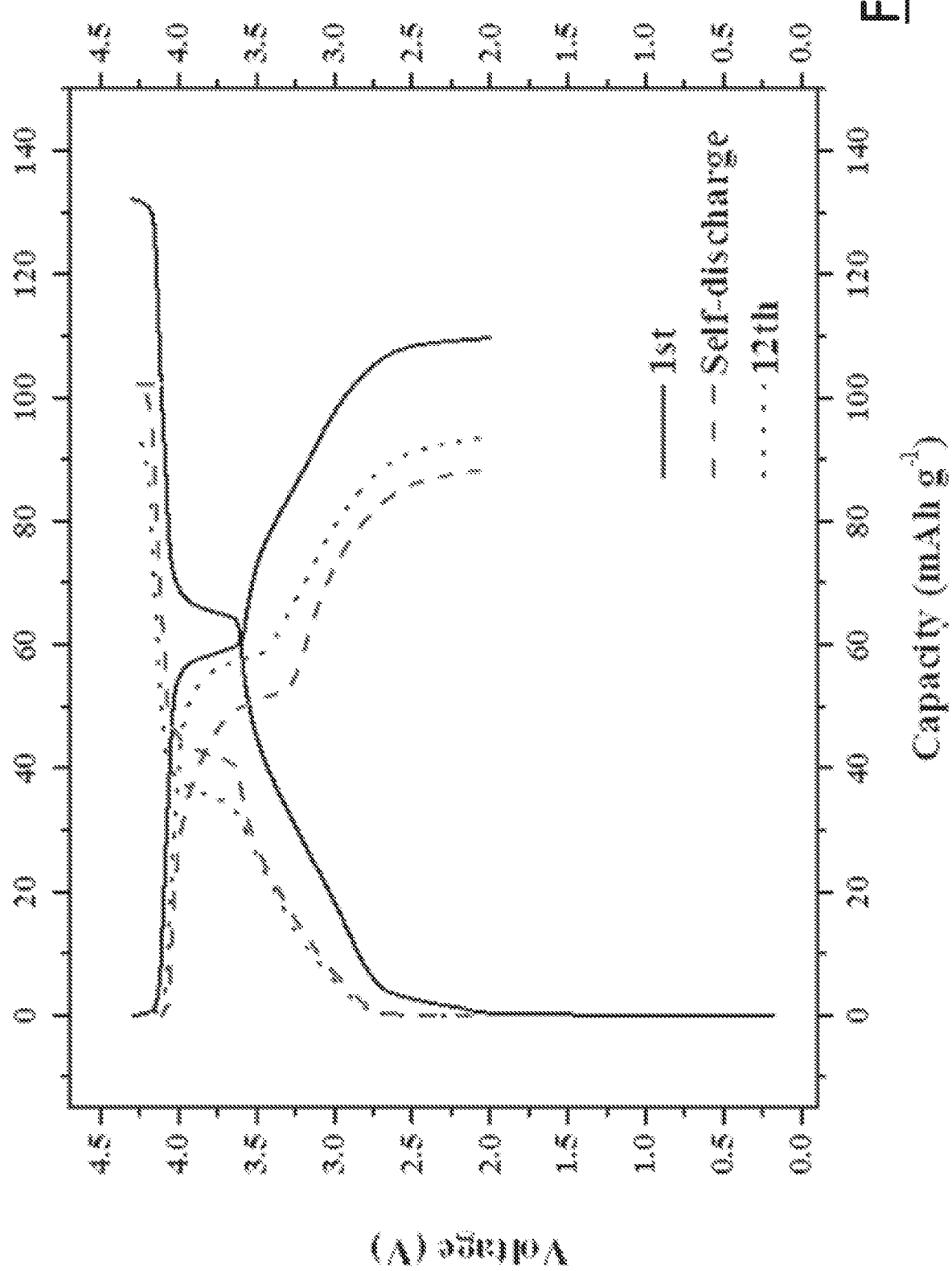
Figure 14:
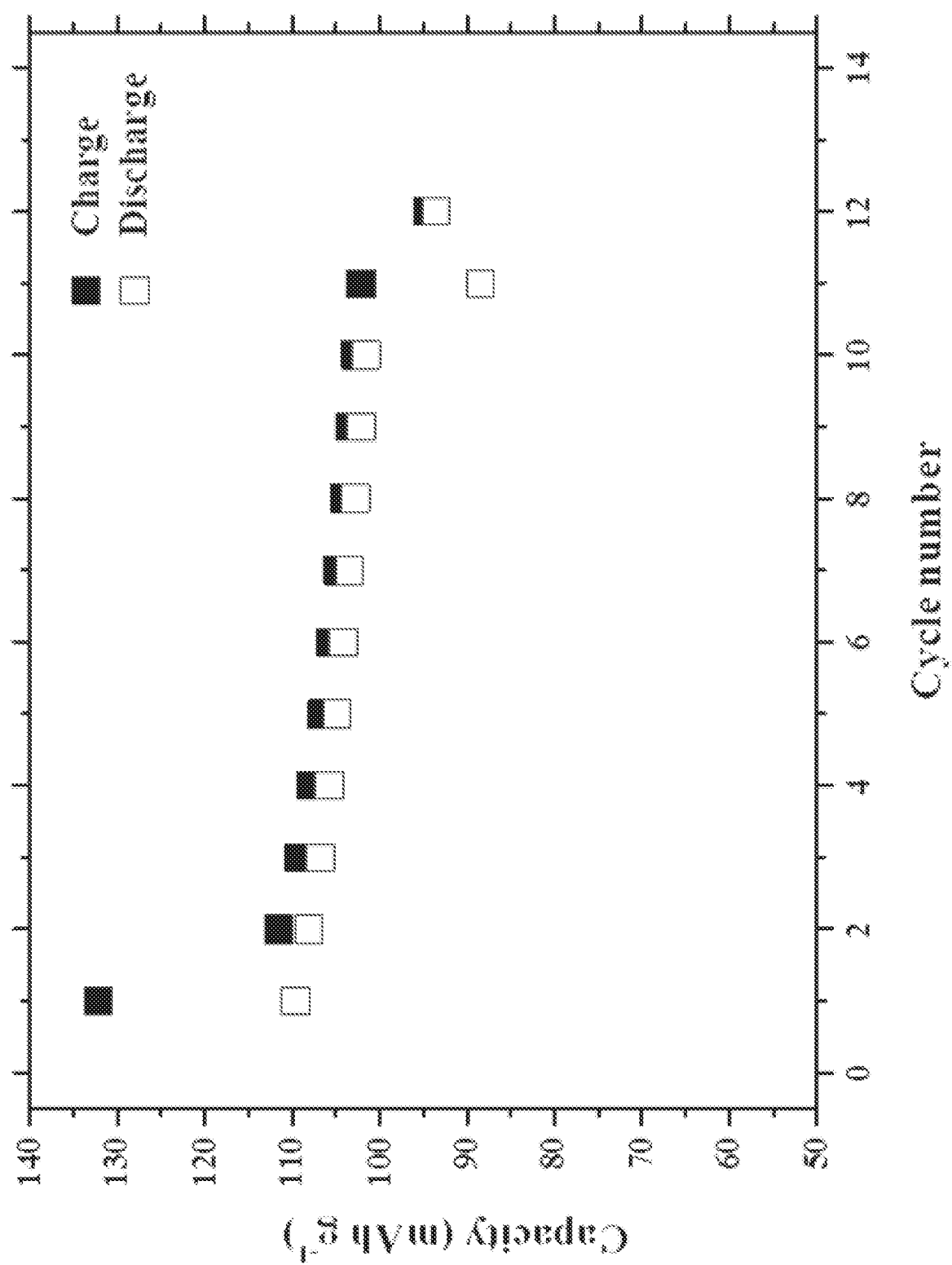
Figure 15:
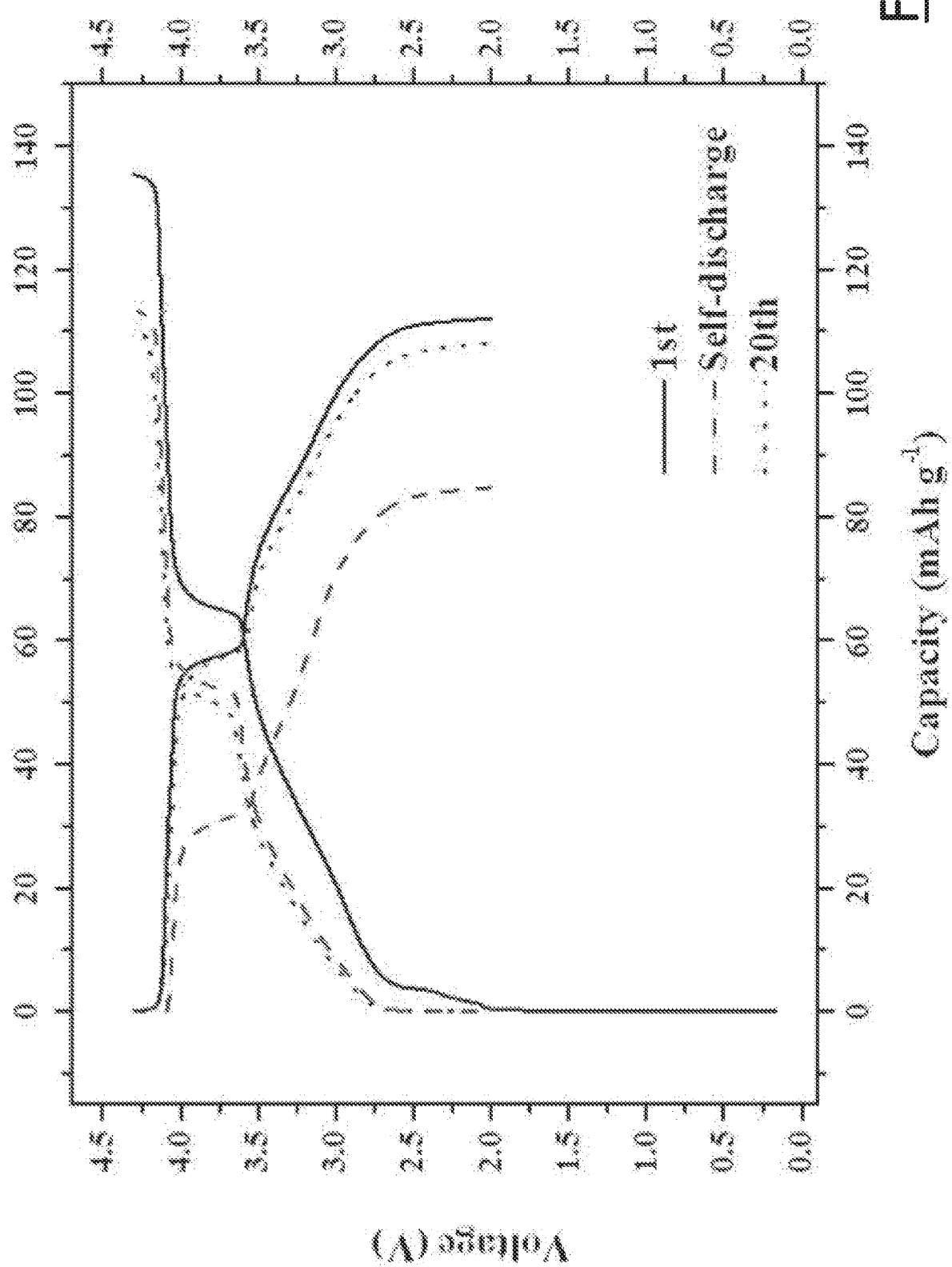
Figure 16:
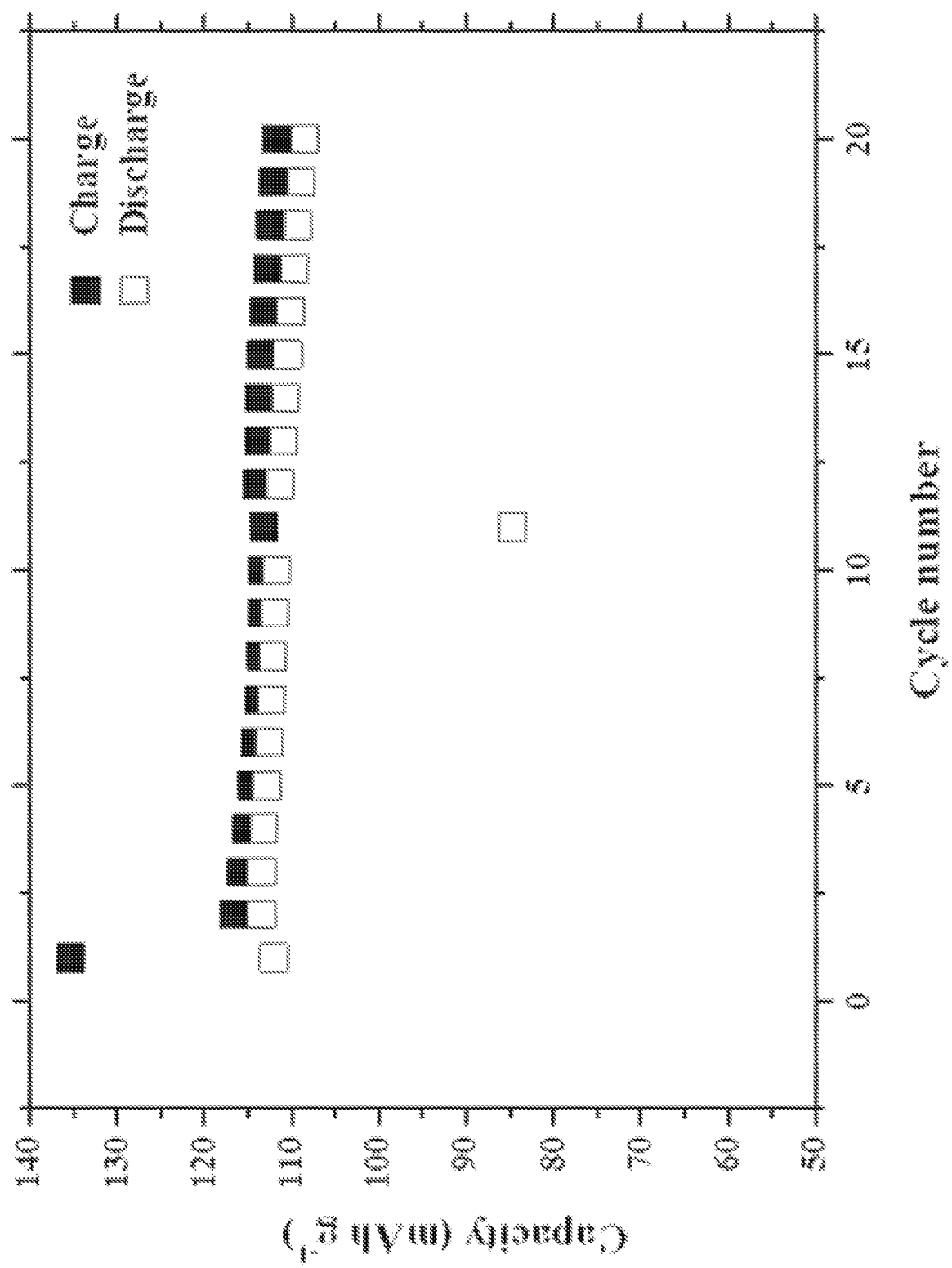
Figure 17:
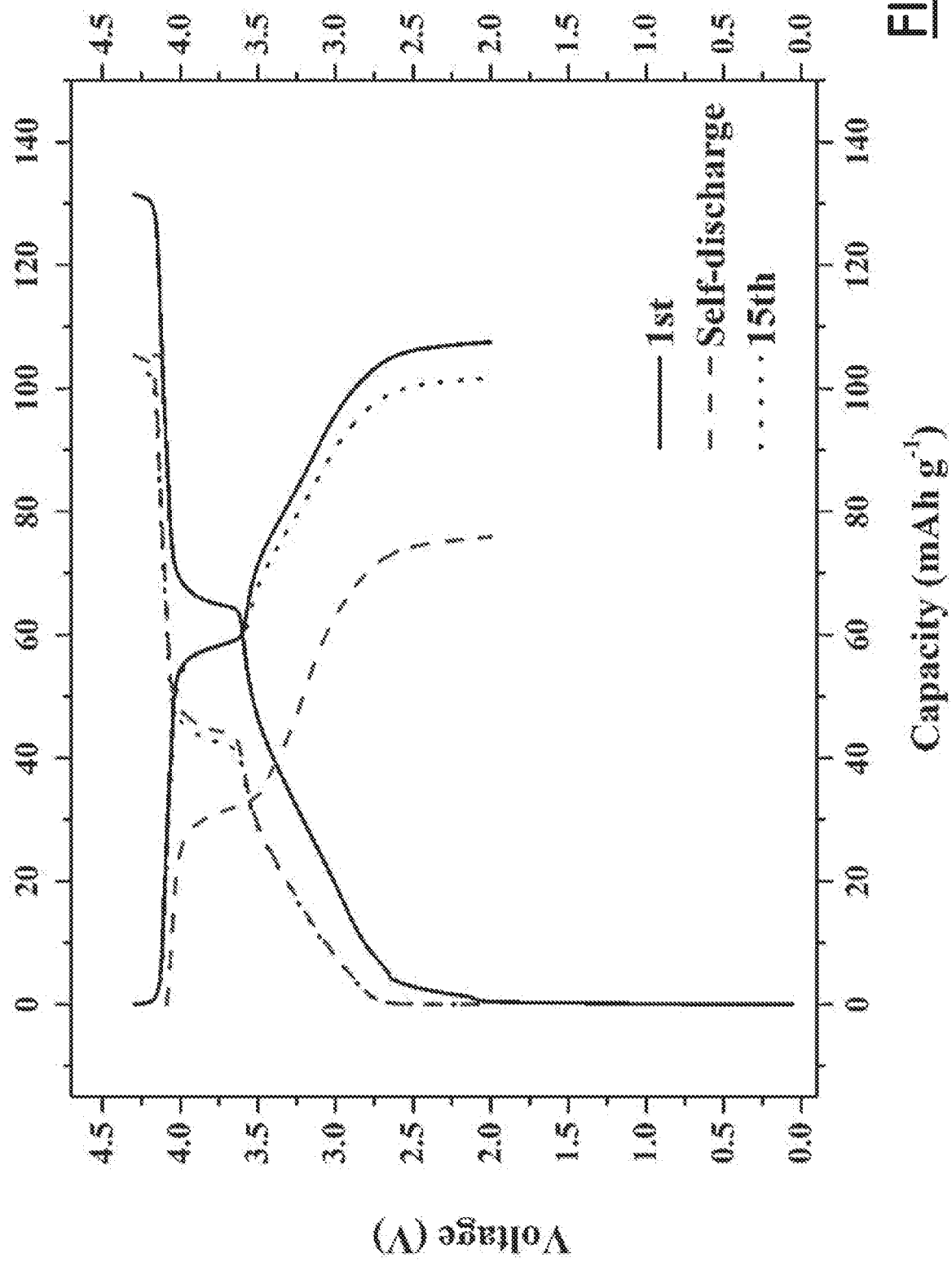
Figure 18:
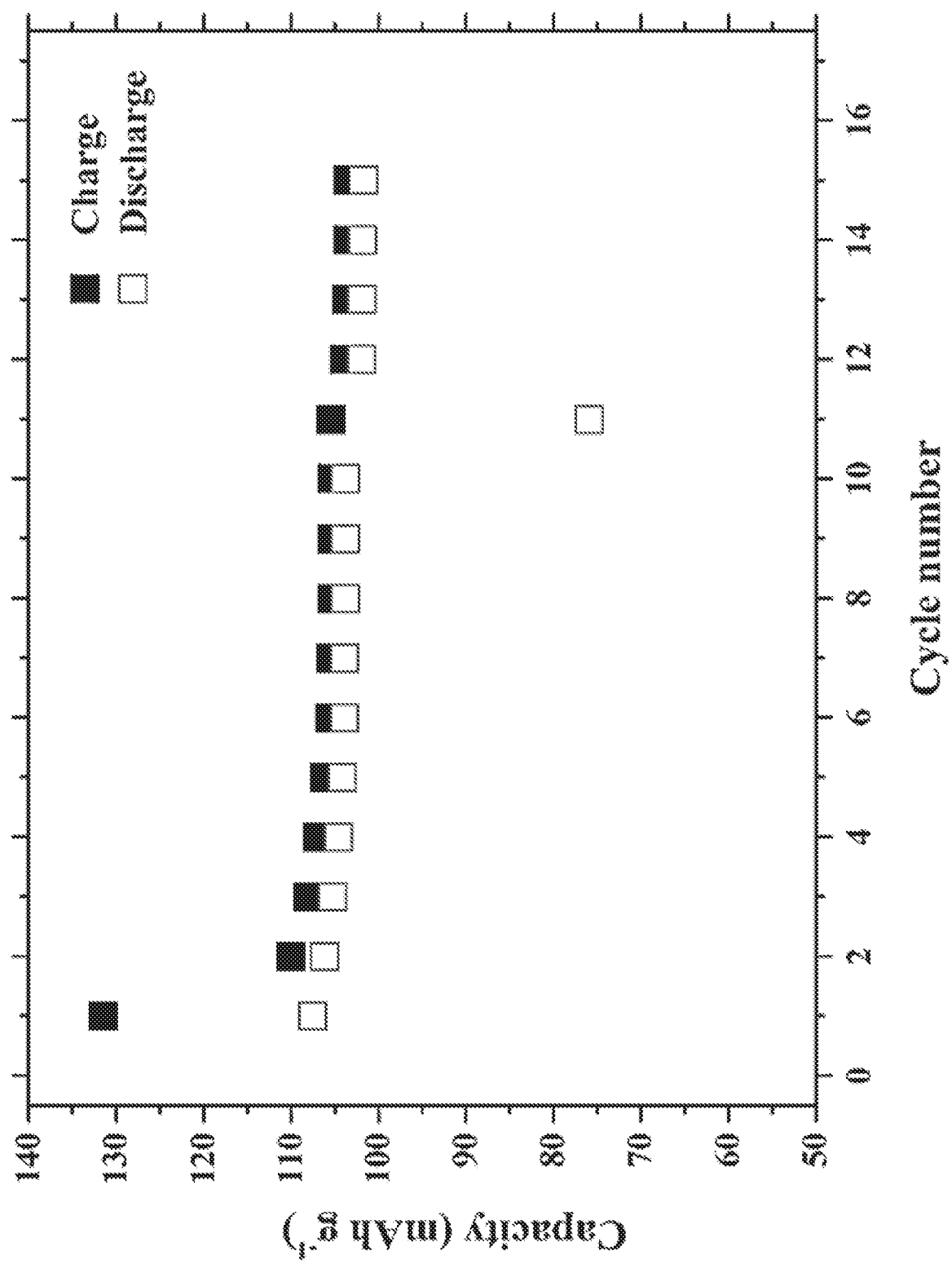
Figure 19:
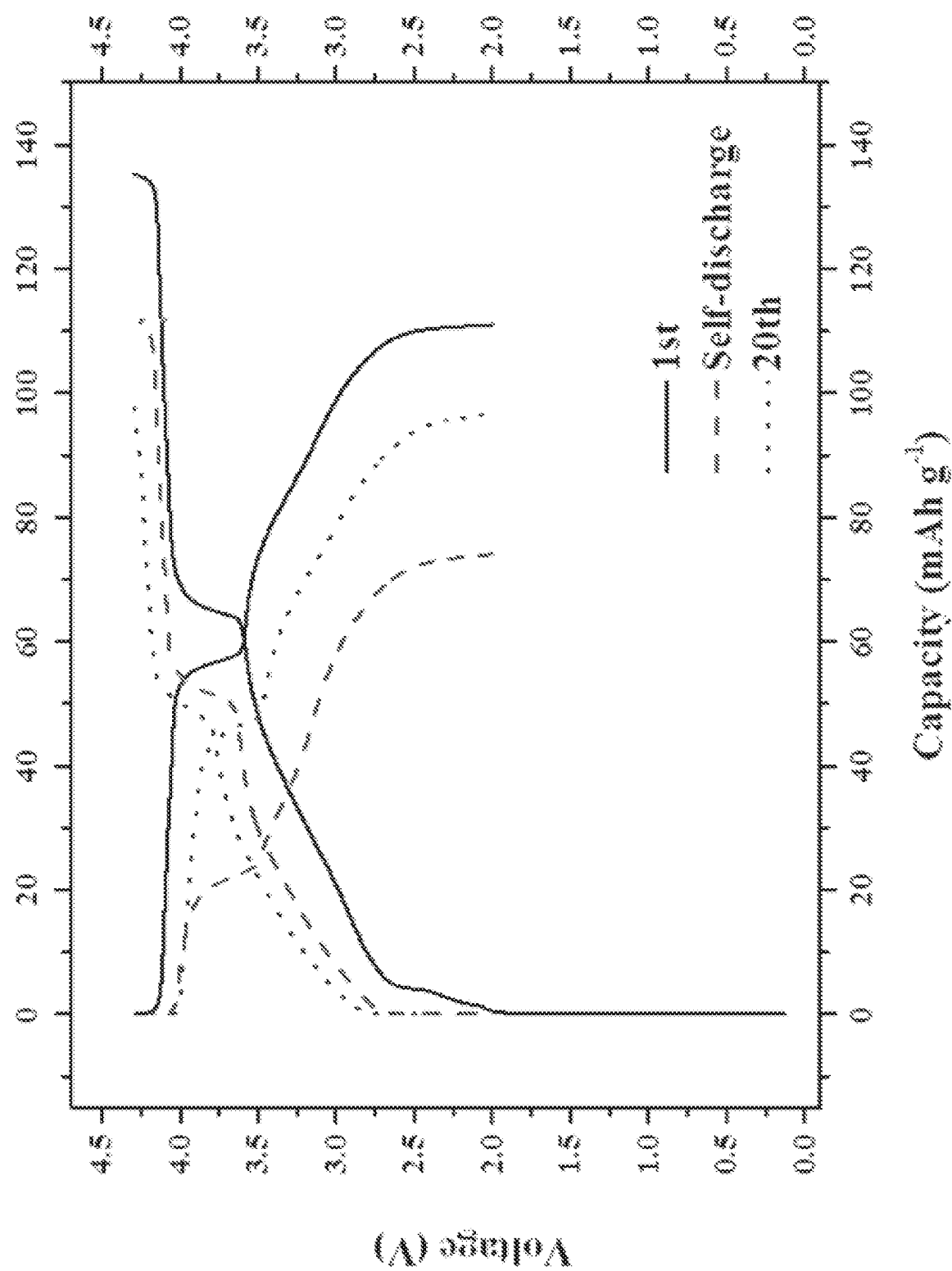
Figure 20:
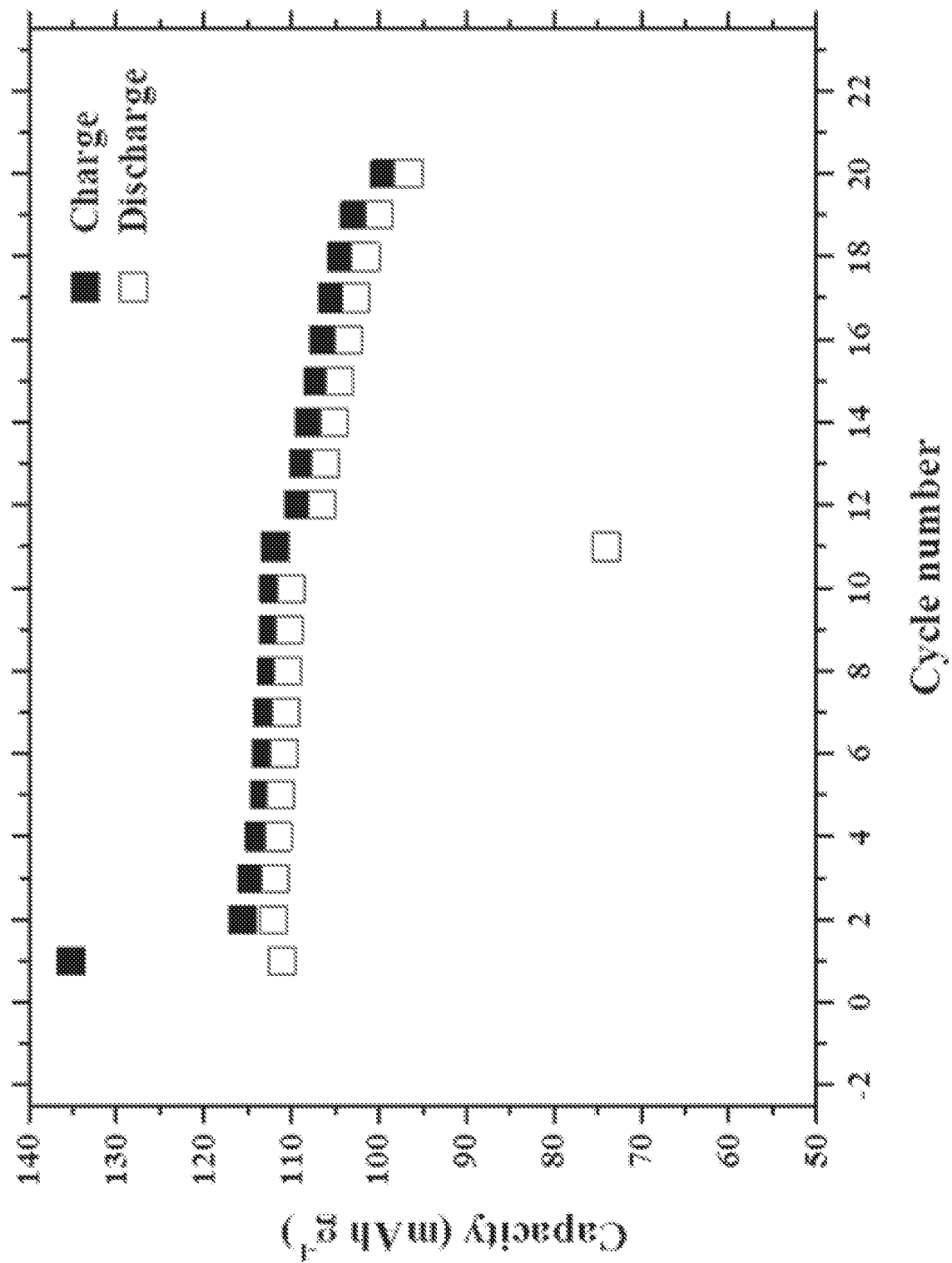
Figure 21:
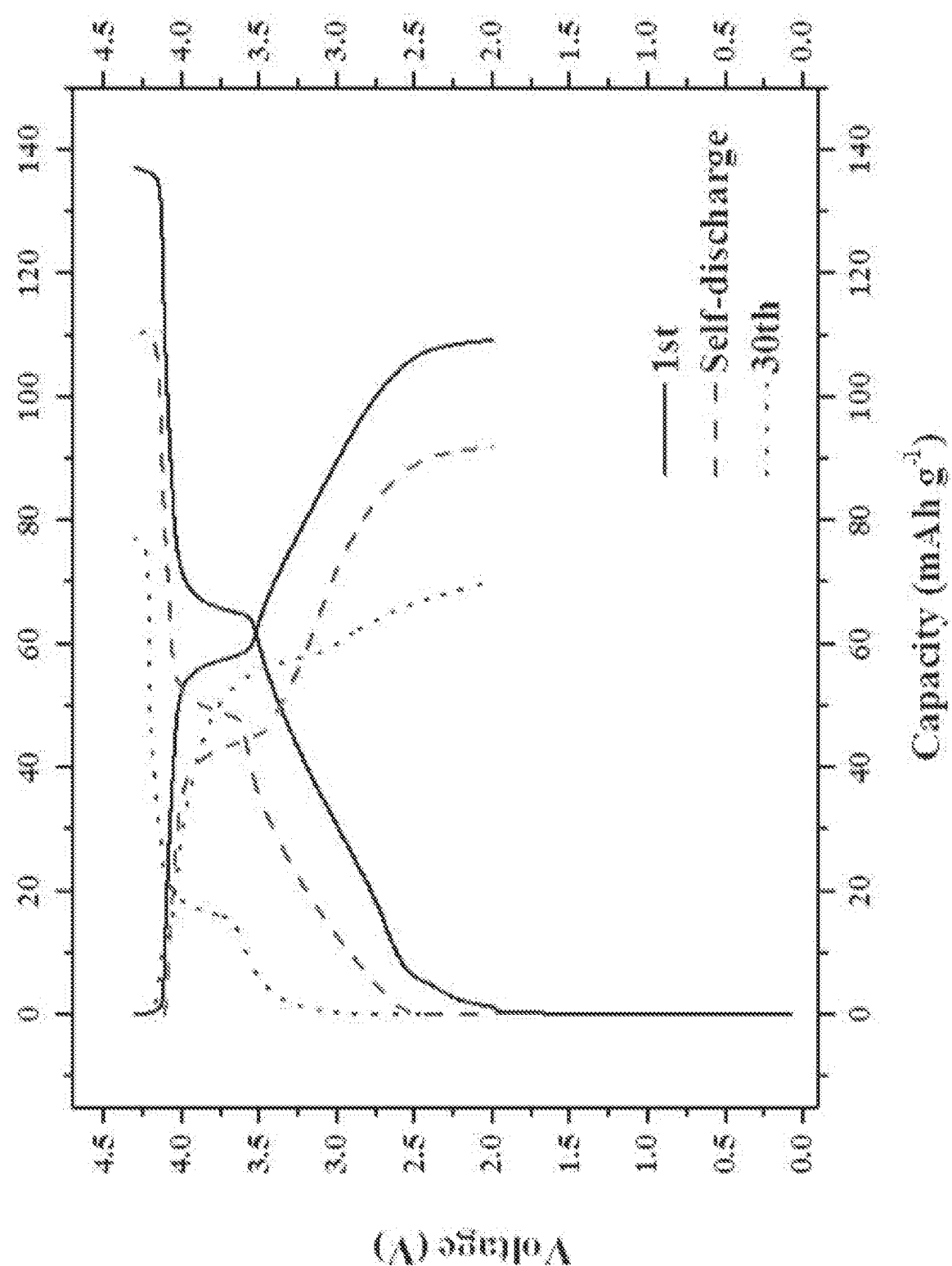
Figure 22:
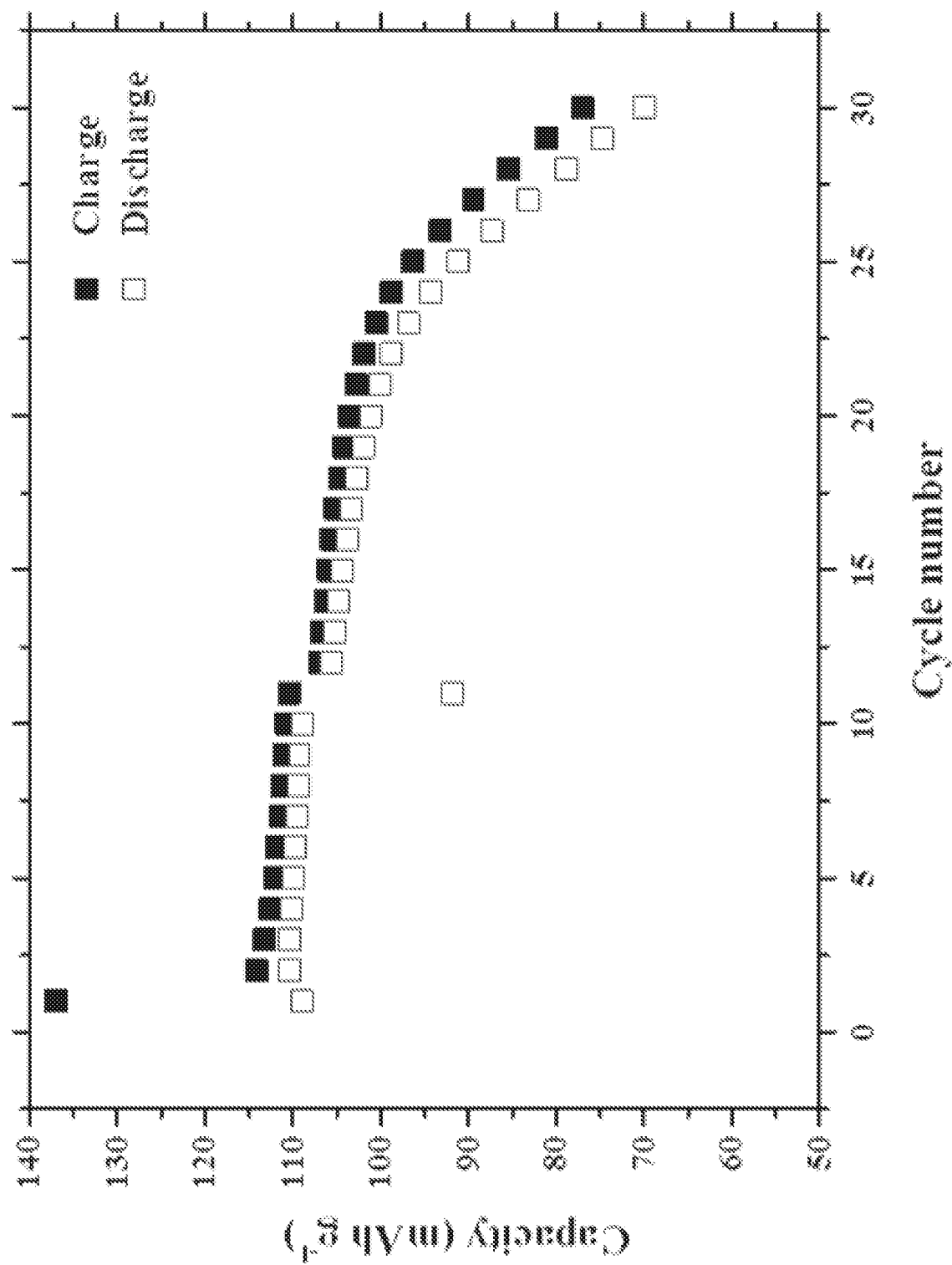

The electrochemical performances, in terms of self-discharge and capacity retention, of each of cells Na—B1 to Na—B11 are reported on annexed FIG. 1 to:

FIG. 1 gives the evolution of the voltage (V) as a function of capacity (in mAh g$^{-1}$ based on the positive electrode active material mass) for battery Na—B1 according to the invention, FIG. 2 gives the evolution of the capacity (in mAh g$^{-1}$ based on the positive electrode active material mass) as a function of the number of cycles for battery Na—B1 according to the invention, FIG. 3 gives the evolution of the voltage (V) as a function of capacity (in mAh g$^{-1}$ based on the positive electrode active material mass) for battery Na—B2 according to the invention, FIG. 4 gives the evolution of the capacity (in mAh g$^{-1}$ based on the positive electrode active material mass) as a function of the number of cycles for battery Na—B2 according to the invention, FIG. 5 gives the evolution of the voltage (V) as a function of capacity (in mAh g$^{-1}$ based on the positive electrode active material mass) for battery Na—B3 not forming part of the invention, FIG. 6 gives the evolution of the capacity (in mAh g$^{-1}$ based on the positive electrode active material mass) as a function of the number of cycles for battery Na—B3 not forming part of the invention, FIG. 7 gives the evolution of the voltage (V) as a function of capacity (in mAh g$^{-1}$ based on the positive electrode active material mass) for battery Na—B4 not forming part of the invention, FIG. 8 gives the evolution of the capacity (in mAh g$^{-1}$ based on the positive electrode active material mass) as a function of the number of cycles for battery Na—B4 not forming part of the invention, FIG. 9 gives the evolution of the voltage (V) as a function of capacity (in mAh g$^{-1}$ based on the positive electrode active material mass) for battery Na—B5 not forming part of the invention, FIG. 10 gives the evolution of the capacity (in mAh g$^{-1}$ based on the positive electrode active material mass) as a function of the number of cycles for battery Na—B5 not forming part of the invention, FIG. 11 gives the evolution of the voltage (V) as a function capacity (in mAh g$^{-1}$ based on the positive electrode active material mass) for battery Na—B6 not forming part of the invention, FIG. 12 gives the evolution of the capacity (in mAh g$^{-1}$ based on the positive electrode active material mass) as a function of the number of cycles for battery Na—B6 not forming part of the invention, FIG. 13 gives the evolution of the voltage (V) as a function of capacity (in mAh g$^{-1}$ based on the positive electrode active material mass) for battery Na—B7 not forming part of the invention, FIG. 14 gives the evolution of the capacity (in mAh g$^{-1}$ based on the positive electrode active material masse) as a function of the number of cycles for battery Na—B7 not forming part of the invention, FIG. 15 gives the evolution of the voltage (V) as a function of capacity (in mAh g$^{-1}$ based on the positive electrode active material mass) for battery Na—B8 not forming part of the invention, FIG. 16 gives the evolution of the capacity (in mAh g$^{-1}$ based on the positive electrode active material mass) as a function of the number of cycles for battery Na—B8 not forming part of the invention, FIG. 17 gives the evolution of the voltage (V) as a function of capacity (in mAh g$^{-1}$ based on the positive electrode active material mass) for battery Na—B9 not forming part of the invention, FIG. 18 gives the evolution of the capacity (in mAh g$^{-1}$ based on the positive electrode active material mass) as a function of the number of cycles for battery Na—B9 not forming part of the invention, FIG. 19 gives the evolution of the voltage (V) as a function of capacity (in mAh g$^{-1}$ based on the positive electrode active material mass) for battery Na—B10 not forming part of the invention, FIG. 20 gives the evolution of the capacity (in mAh g$^{-1}$ based on the positive electrode active material mass) as a function of the number of cycles for battery Na—B10 not forming part of the invention, FIG. 21 gives the evolution of the voltage (V) as a function of capacity (in mAh g$^{-1}$ based on the positive electrode active material mass) for battery Na—B11 according to the invention, FIG. 22 gives the evolution of the capacity (in mAh g$^{-1}$ based on the positive electrode active material mass) as a function of the number of cycles for battery Na—B11 according to the invention.

As disclosed in the comparative examples (like EC3~EC10), single, binary and wrong ternary combination of additives cannot achieve the purpose of decreased self-discharge and enhanced capacity retention ability at 55° C. In contrast, with the properly chosen combination of additives according to the present invention (like EC1), the side reactions occurring at both positive and negative electrodes can be suppressed, hence enabling to achieve good cycling performances. However, for even better results, i.e. for a full optimization leading to higher capacity retention capability, the addition of vinylene carbonate is preferred. Moreover, we experienced that the good flexibility and wettability of CMC, as opposed to PVdF, is beneficial to the formation of a passivating layer from the additives which shows high efficacy for limiting side reactions.

The invention claimed is:

1. An electrolyte composition comprising at least a sodium salt dissolved in at least one solvent and a combination of additives, wherein:
   said solvent is selected from the group consisting of ethylene carbonate, dimethyl carbonate, ethyl methyl carbonate, diethyl carbonate, propylene carbonate, ethyl acetate, ethyl propionate, methyl propionate and mixtures thereof;
   the combination of additives includes at least:
   sodium difluoro(oxalato)borate (NaODFB), as a first additive,
   at least a nitrile of formula (I):

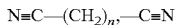
   N≡C—(CH$_2$)$_n$,—C≡N    (I)

with n being an integer equal to 2, 3 or 4, as a second additive; and
   1,3-propane sultone or ethylene sulfate, as a third additive, wherein the amount of (oxalato)borate ranges from 0.05 to 10 wt. %, relative to the total weight of the electrolyte composition.

2. The electrolyte composition according to claim 1, wherein nitrile of formula (I) is succinonitrile.

3. The electrolyte composition according to claim 2, wherein the amount of succinonitrile ranges from 0.1 to 5.0 wt. %, relative to the total weight of the electrolyte composition.

4. The electrolyte composition according to claim 1, wherein the amount of nitrile of formula (I) ranges from 0.1 to 10 wt. %, relative to the total weight of the electrolyte composition.

5. The electrolyte composition according to claim 1, wherein the amount of said third additive ranges from 0.1 to 5.0 wt. %, relative to the total weight of the electrolyte composition.

6. The electrolyte composition according to claim 1, wherein said third additive is 1,3-propane sultone.

7. The electrolyte composition according to claim 1, wherein the solvent is a mixture of at least two solvents comprising ethylene carbonate as a first solvent and a second solvent selected from the group consisting of dimethyl carbonate, ethyl methyl carbonate, diethyl carbonate, propylene carbonate, ethyl acetate, ethyl propionate and methyl propionate.

8. The electrolyte composition according to claim 1, wherein the mixture of at least two solvents comprises a mixture of ethylene carbonate and propylene carbonate in a volume ratio of 1:1.

9. The electrolyte composition according to claim 1, wherein said combination of additives further comprises a forth additive selected from the group consisting of vinylene carbonate and vinylethylene carbonate.

10. The electrolyte composition according to claim 9, wherein the amount of said forth additive ranges from 0.1 to 10.0 wt. %, relative to the total weight of the electrolyte composition.

11. The electrolyte composition according to claim 1, wherein said electrolyte composition includes sodium difluoro(oxalato)borate, succinonitrile, 1,3-propane sultone and vinylene carbonate.

12. The electrolyte composition according to claim 1, wherein said electrolyte composition includes sodium difluoro(oxalato)borate, succinonitrile, 1,3-propane sultone and vinylene carbonate in a mixture of ethylene carbonate and propylene carbonate in a volume ratio of 1:1.

13. A non-aqueous liquid electrolyte for use in a Na-ion battery comprising an electrolyte composition according to claim 1.

14. The electrolyte according to claim 13, wherein said Na-ion battery comprises a hard carbon negative electrode including a binder.

15. A non-aqueous liquid electrolyte to reduce self-discharge and enhance retention capacity in a Na-ion battery comprising an electrolyte composition according to claim 1.

16. A Na-ion battery comprising:
   at least one positive electrode comprising at least one positive electrode active material and a current collector,
   at least one negative electrode comprising a negative electrode active material, and
   at least one separator impregnated with a non-aqueous liquid electrolyte, said separator being disposed between said positive electrode and said negative electrode,
   wherein said non-aqueous liquid electrolyte is an electrolyte composition of claim 1.

17. The Na-ion battery according to claim 16, wherein the negative electrode active material of the negative electrode is a carbon material and said negative electrode further comprises a polymer binder.

18. The Na-ion battery according to claim 17, wherein said polymer binder is carboxymethylcellulose.

* * * * *